Sept. 22, 1936.          C. A. BICKEL              2,055,227
                      MOTOR AUTOMATIC LATHE
                      Filed Jan. 8, 1934           27 Sheets-Sheet 4
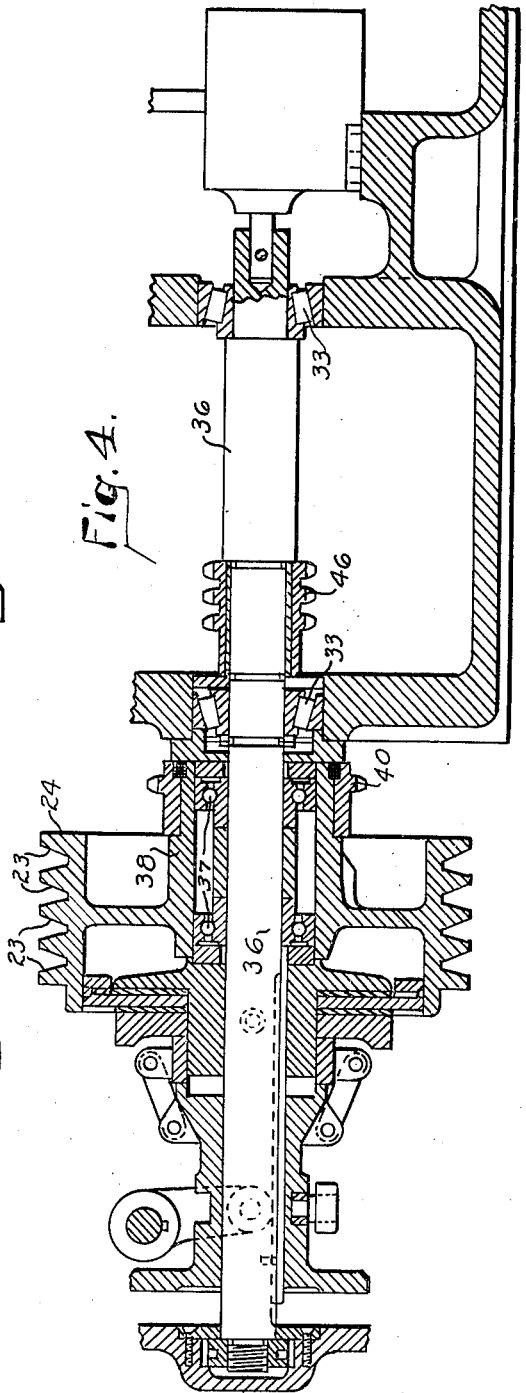
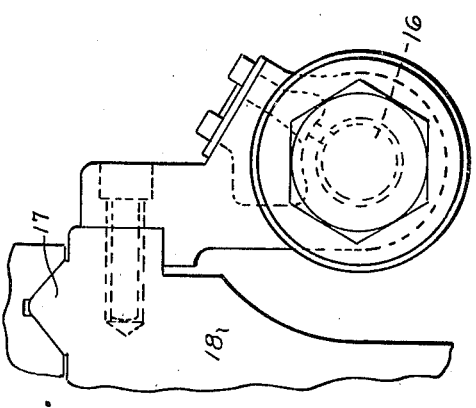
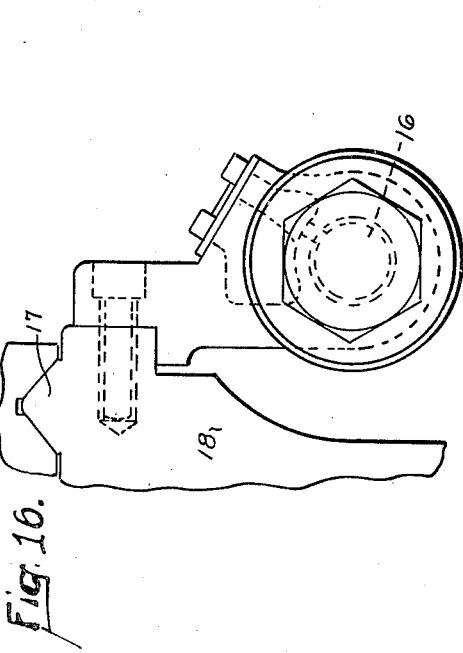
Inventor
CLIFFORD A. BICKEL,
By
    Attorneys

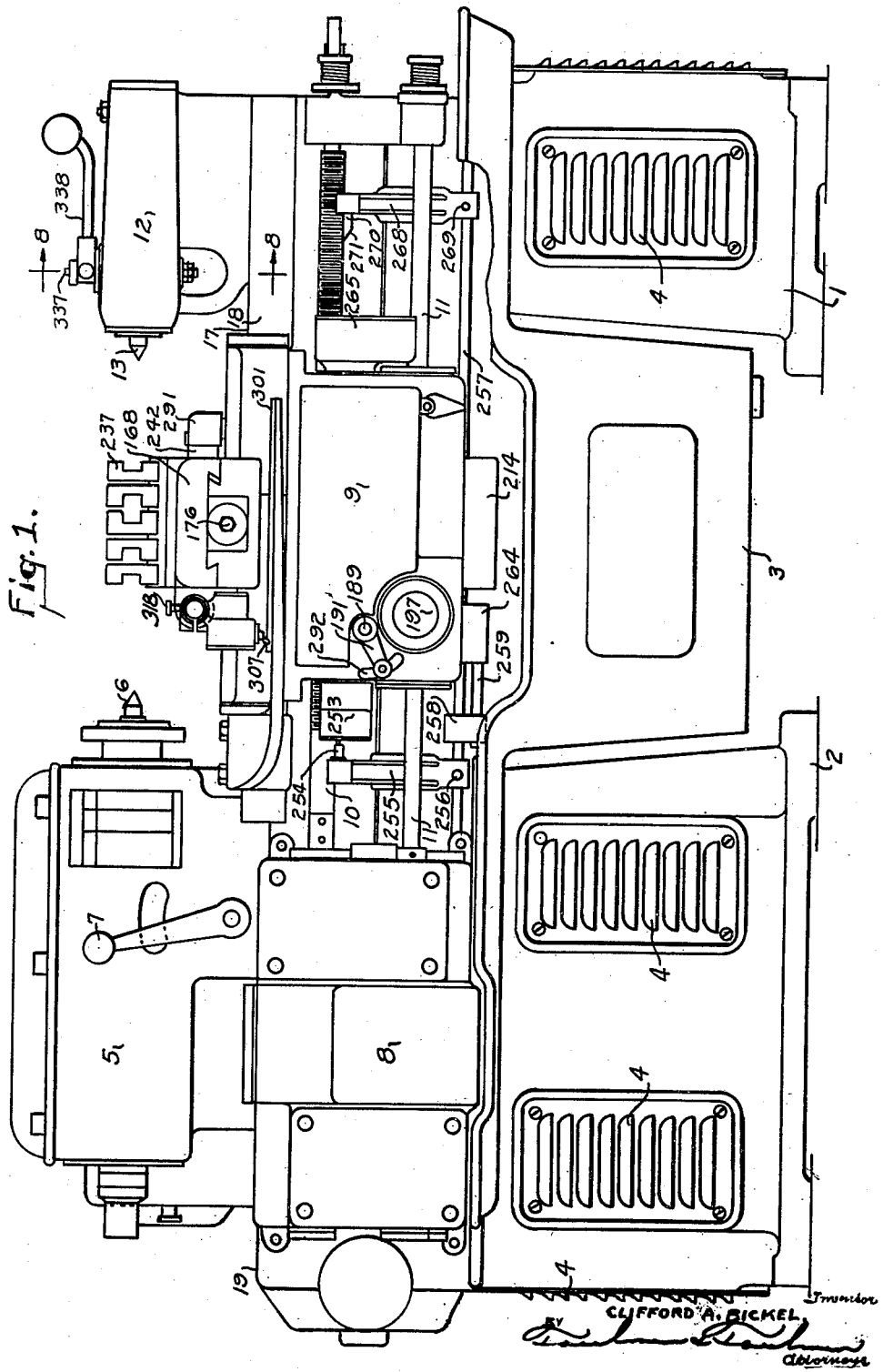

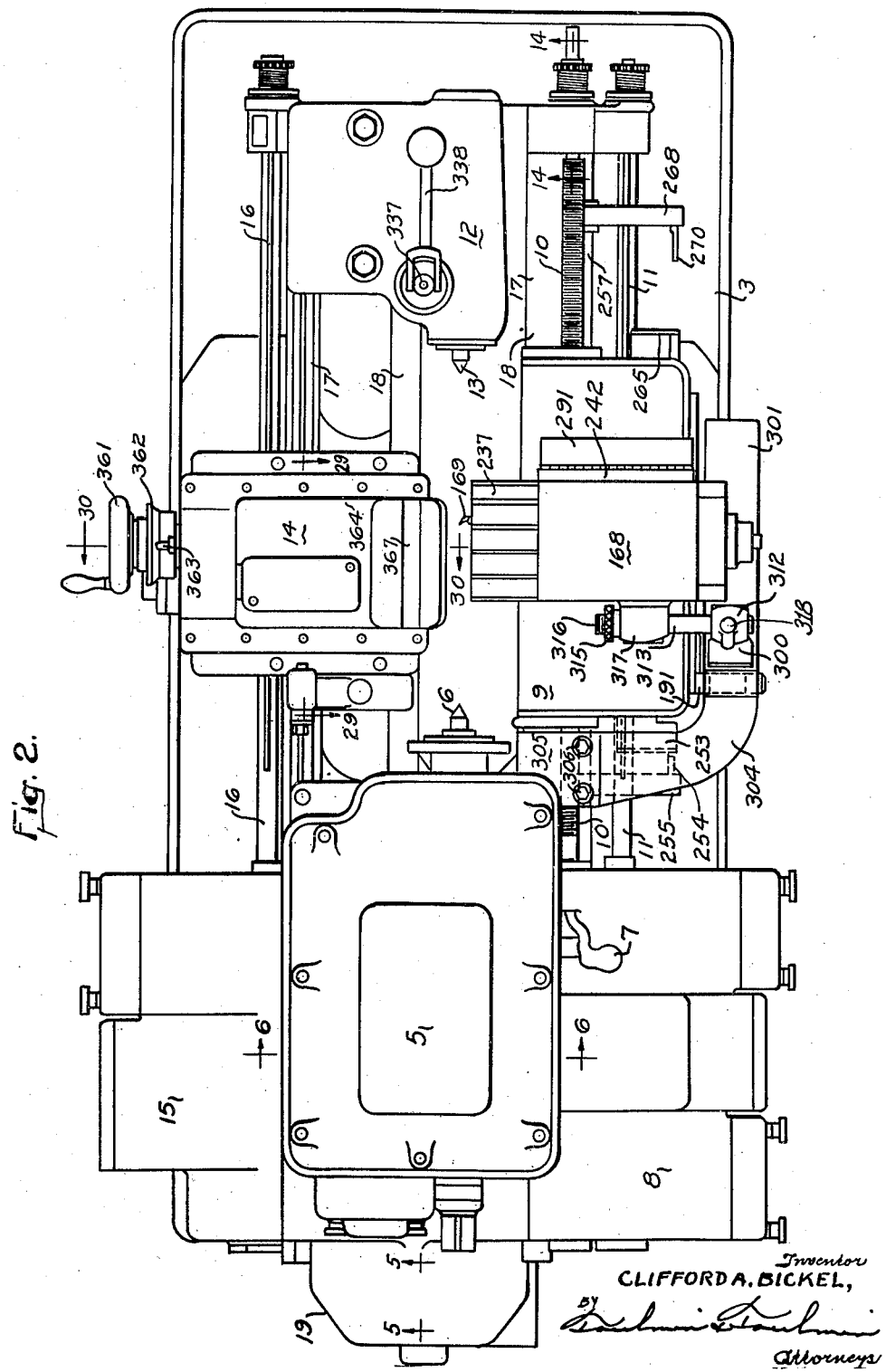

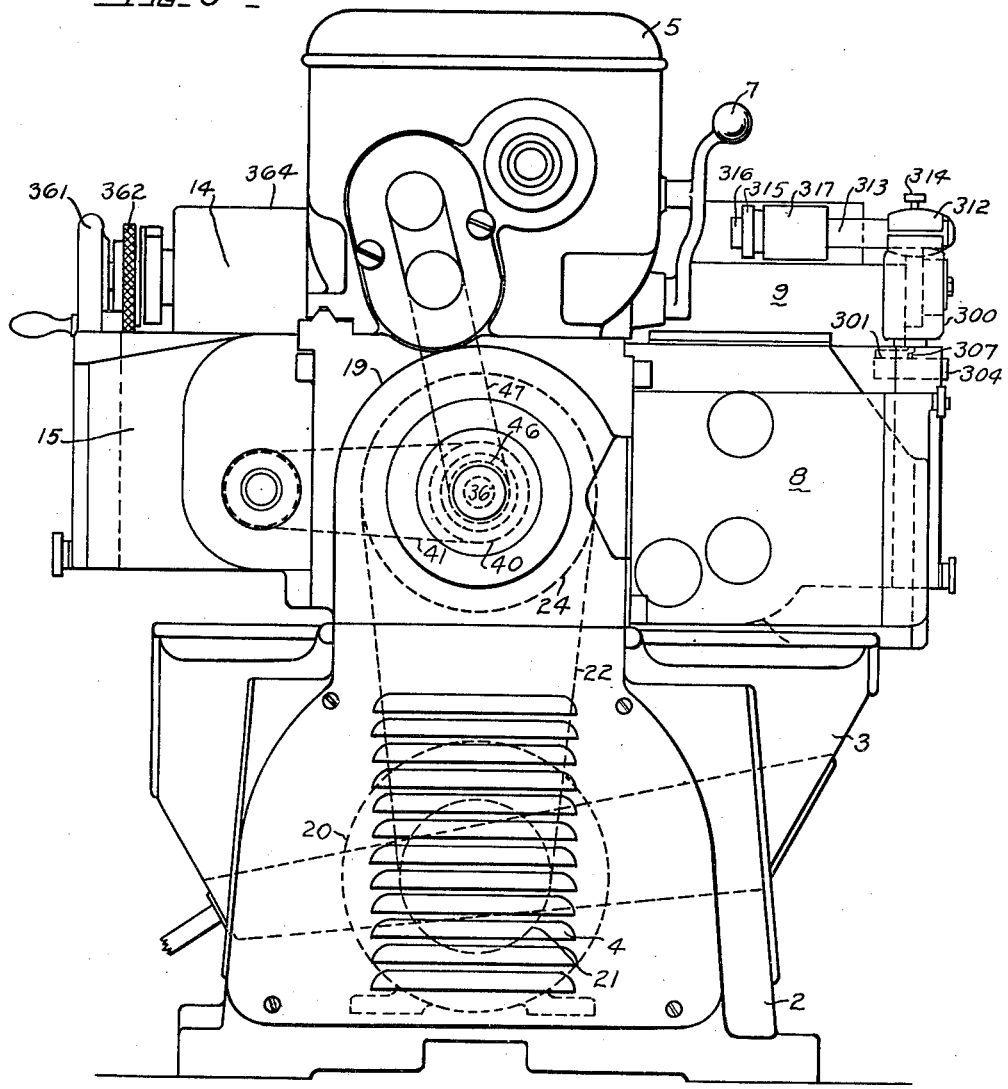

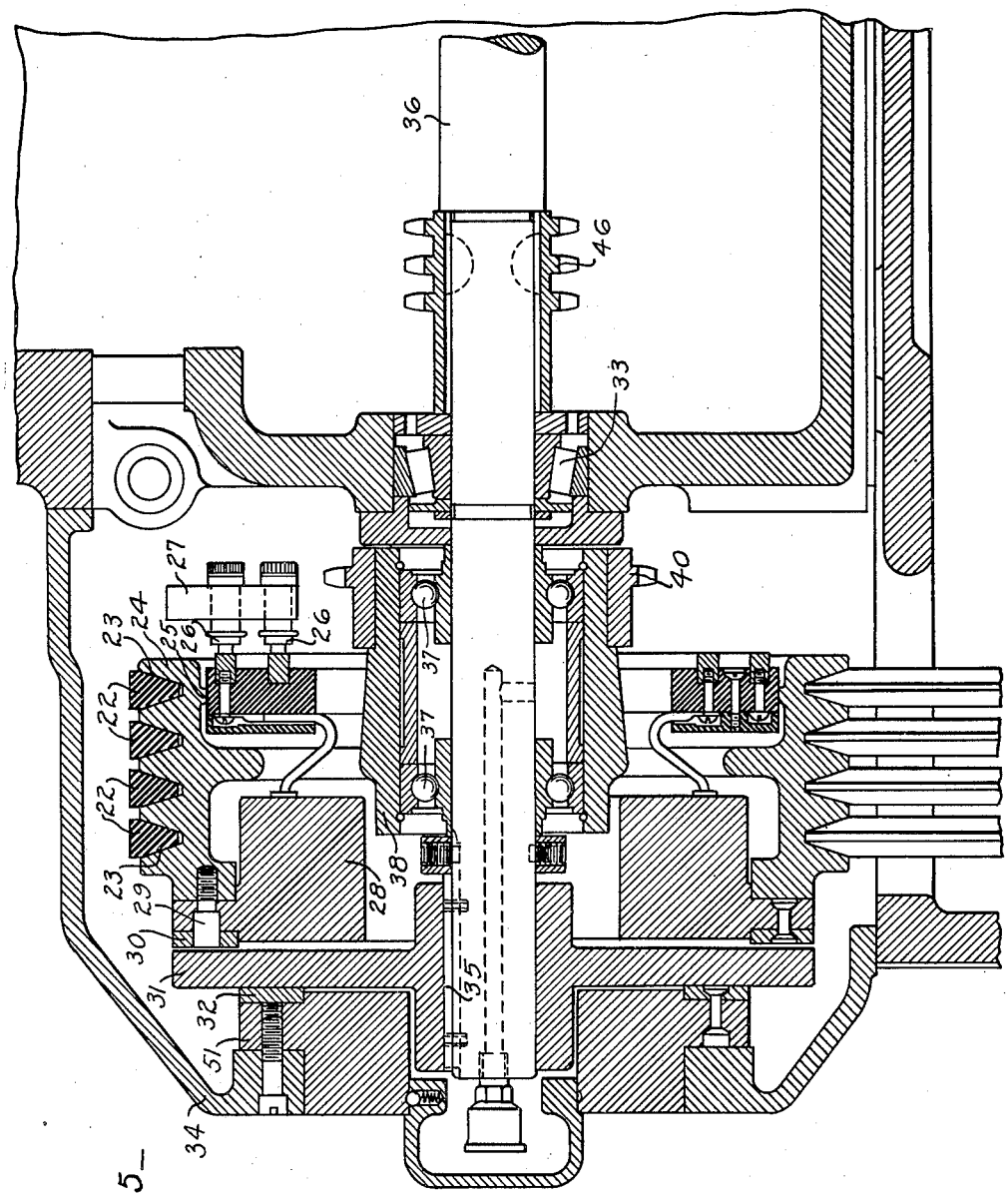

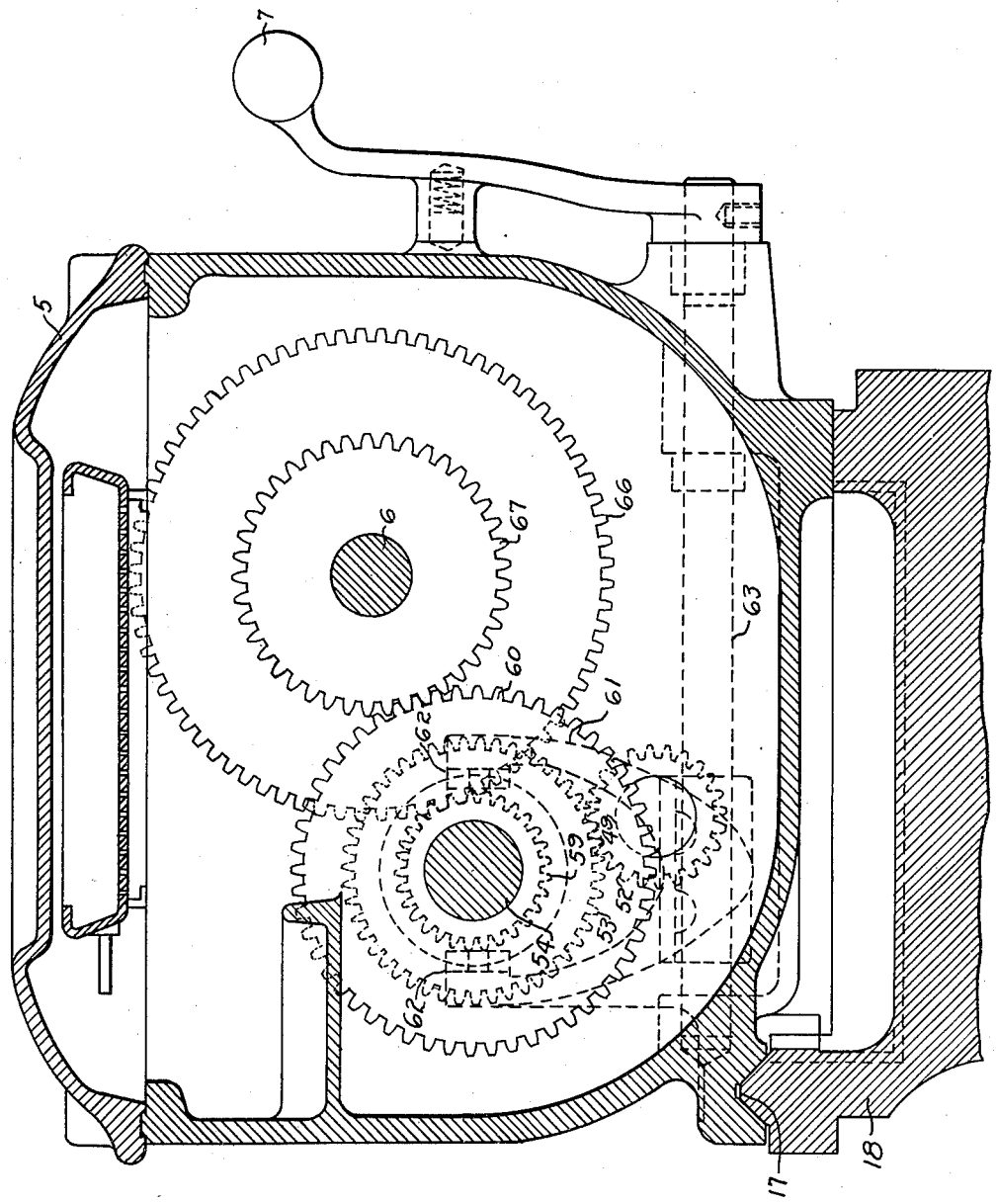

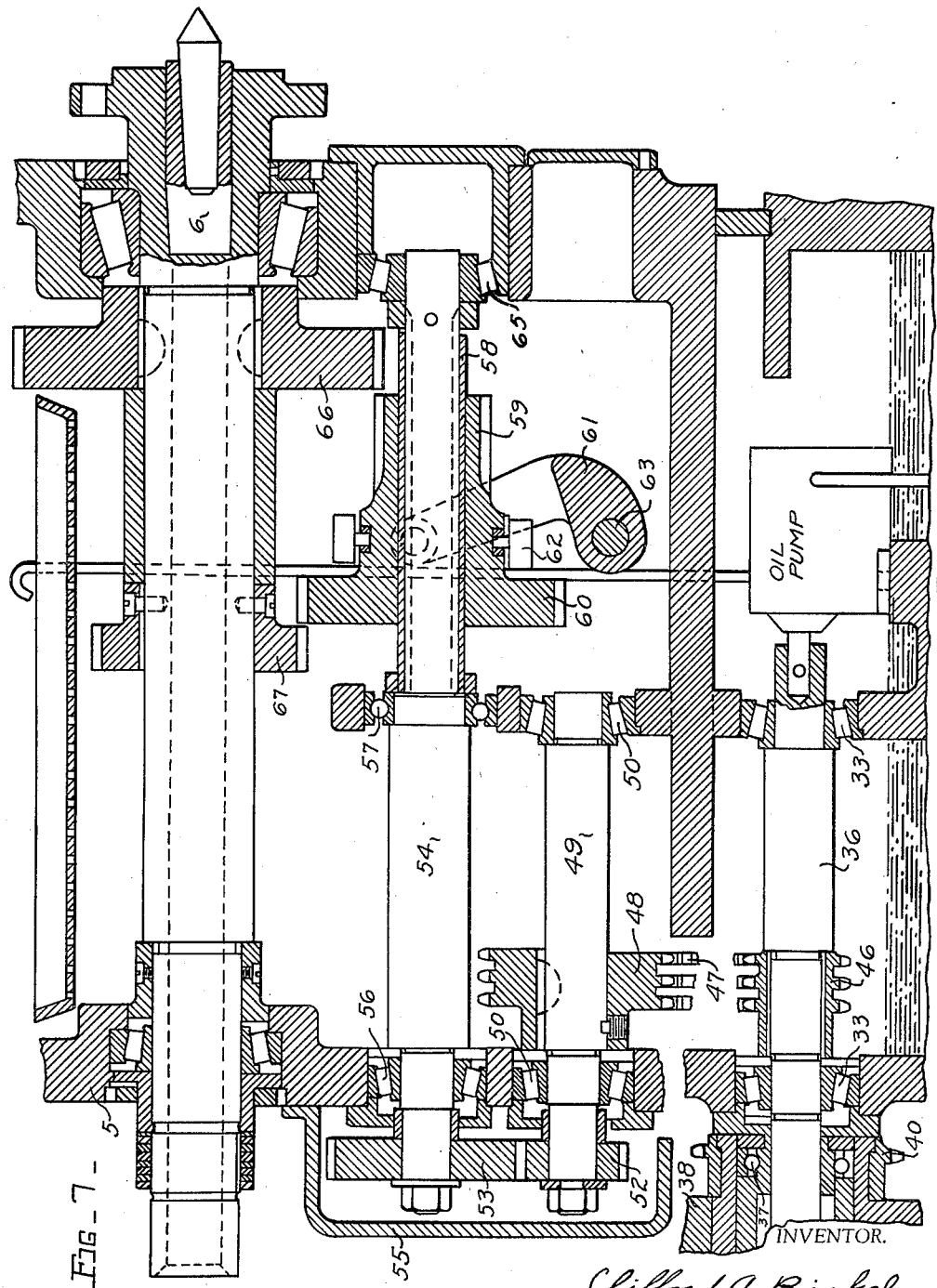

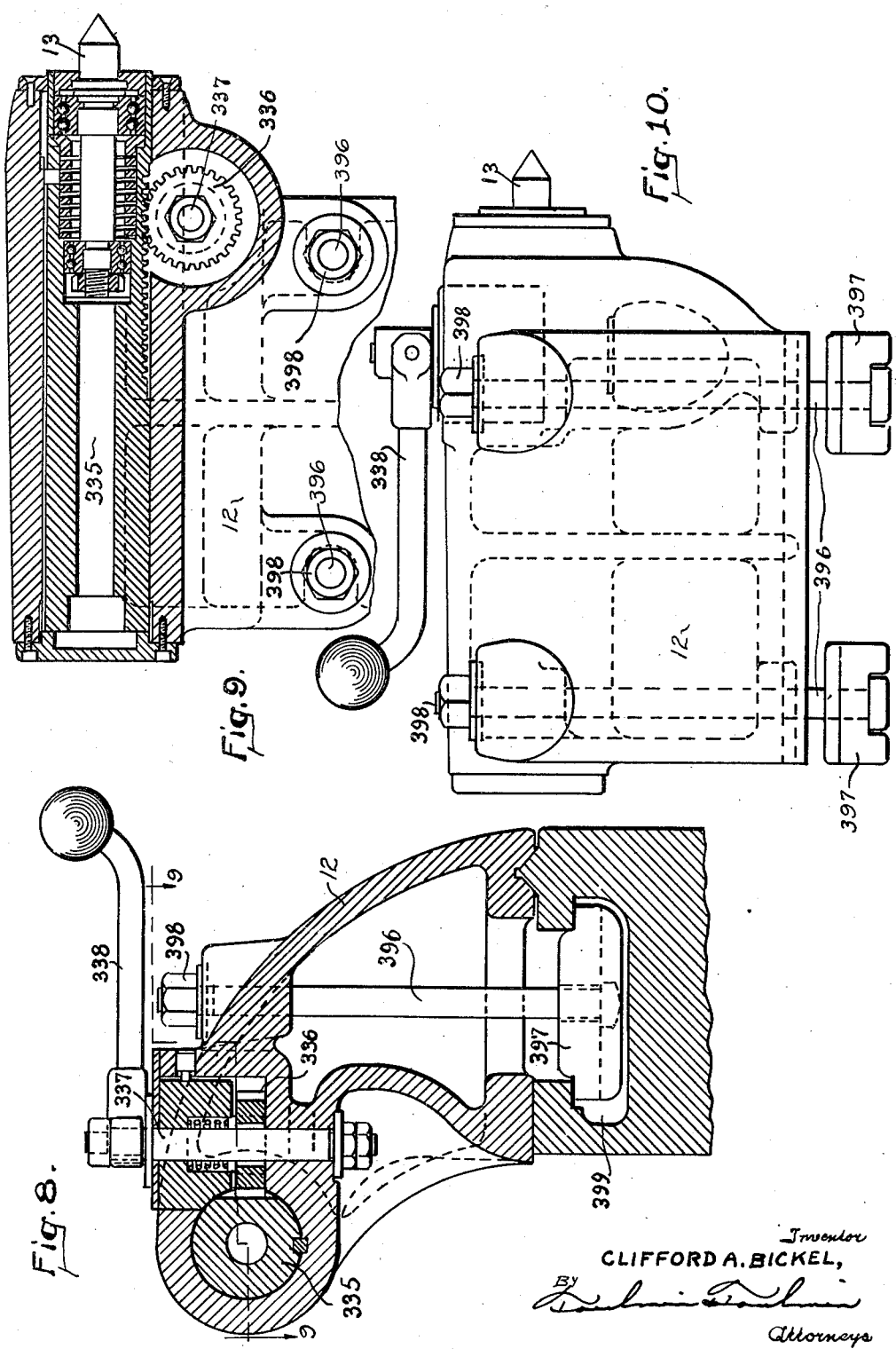

Sept. 22, 1936.  C. A. BICKEL  2,055,227
MOTOR AUTOMATIC LATHE
Filed Jan. 8, 1934    27 Sheets-Sheet 9
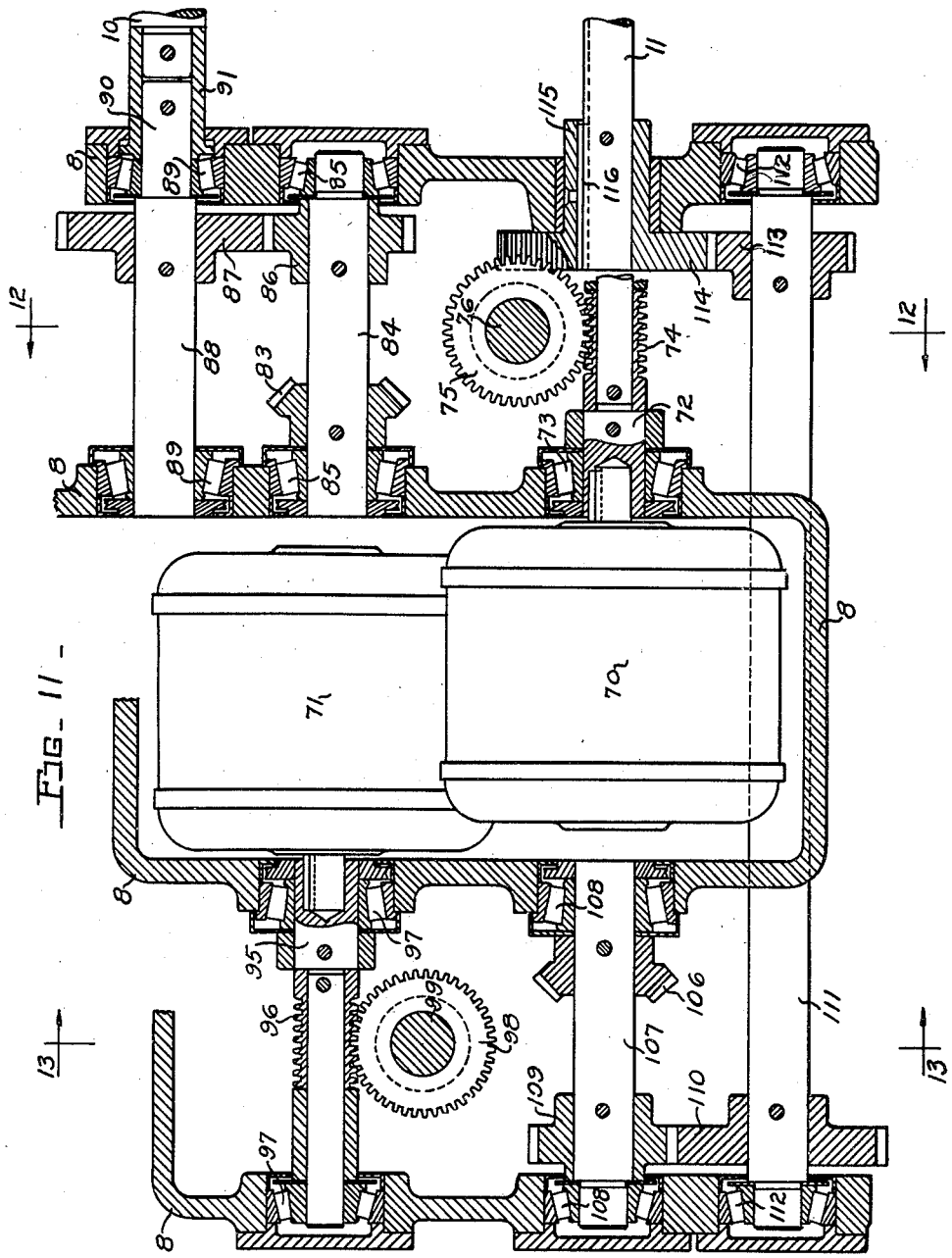
INVENTOR.
Clifford A. Bickel
BY
ATTORNEYS

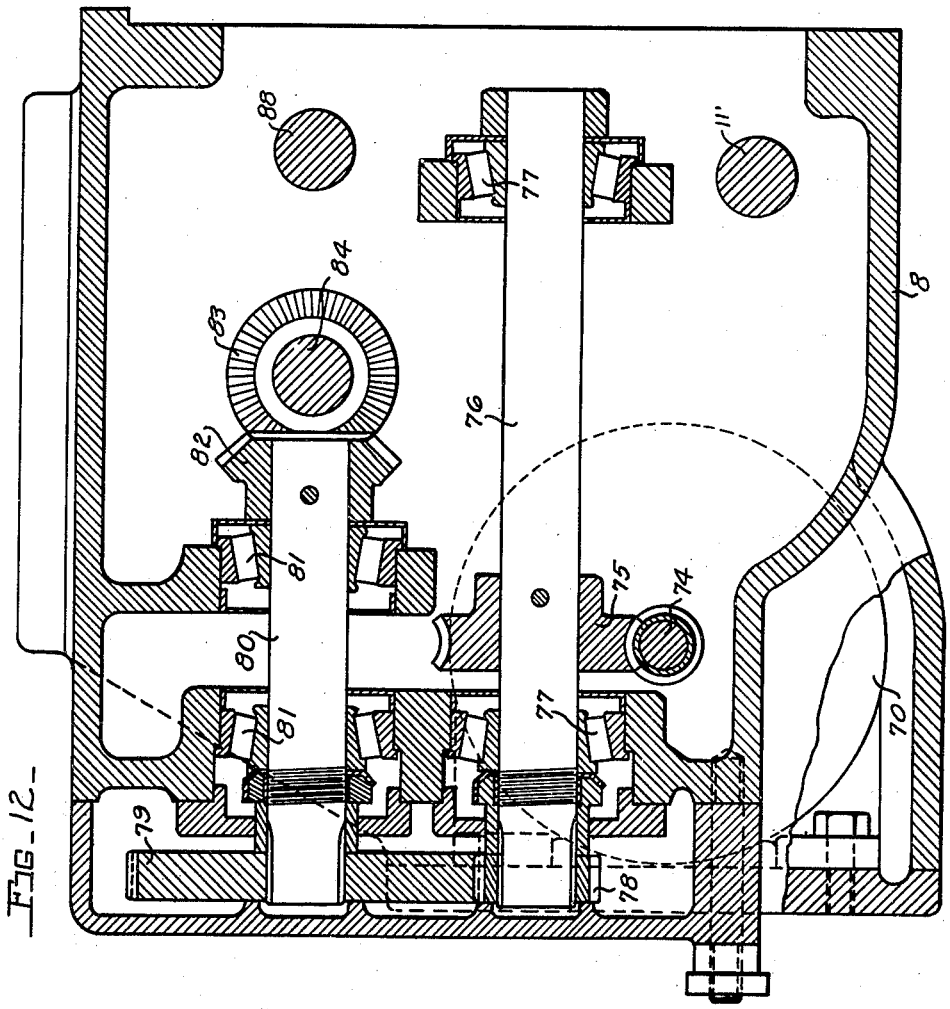

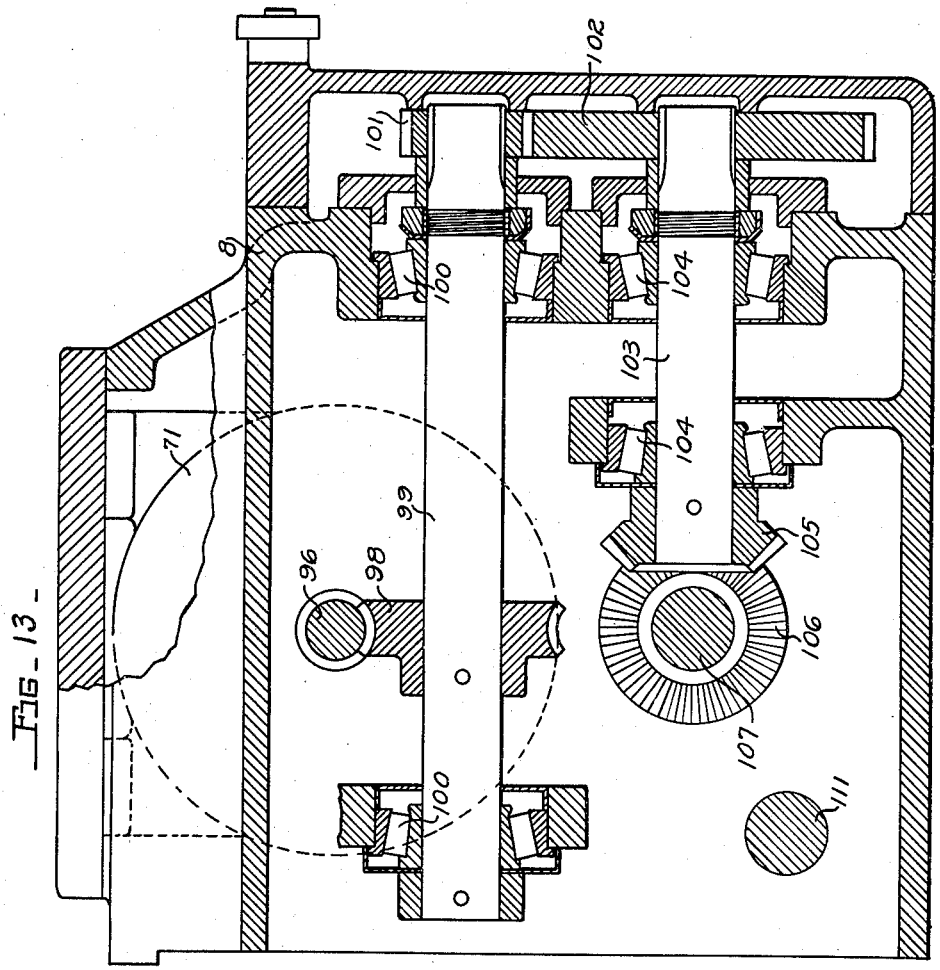

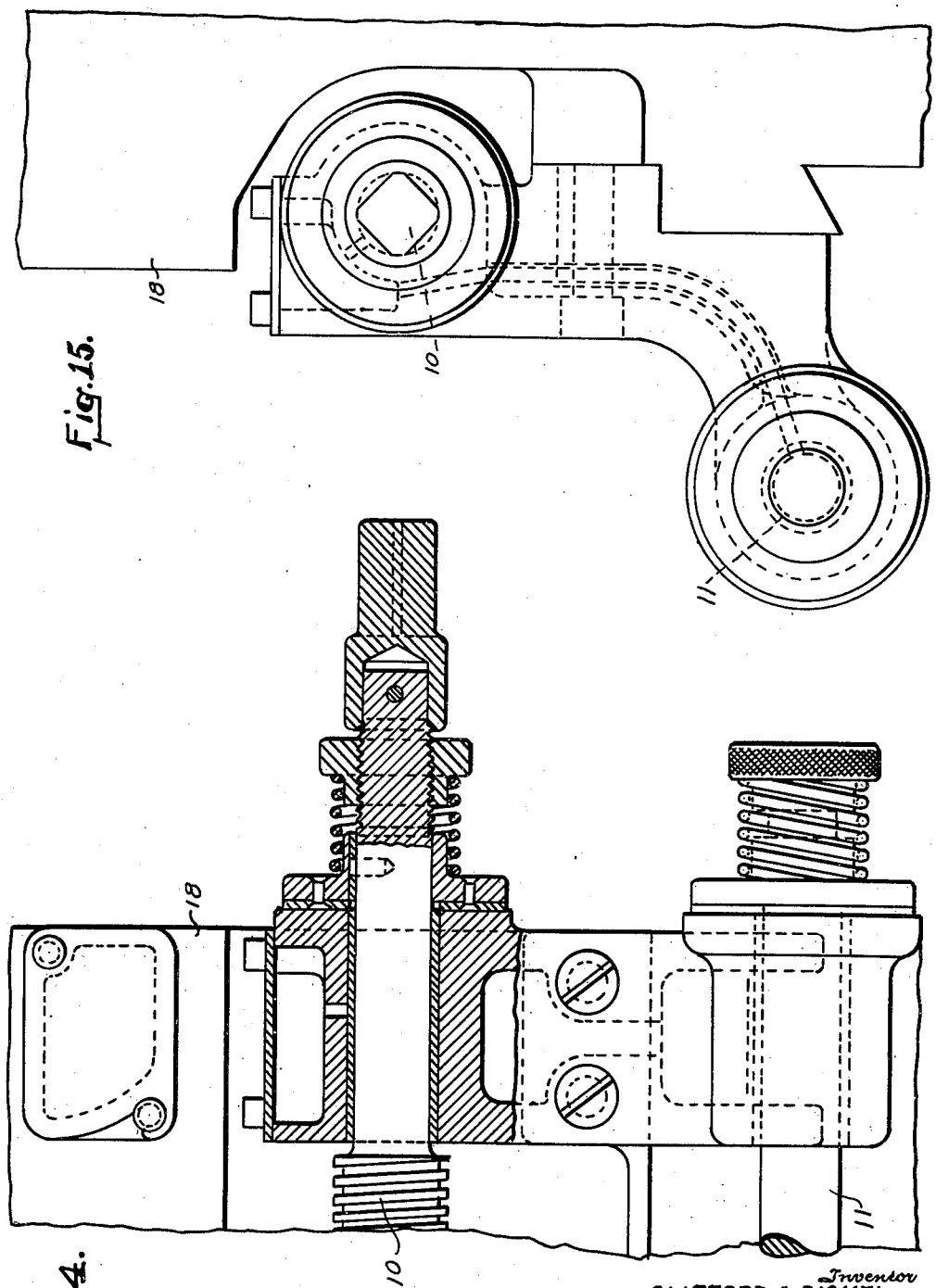

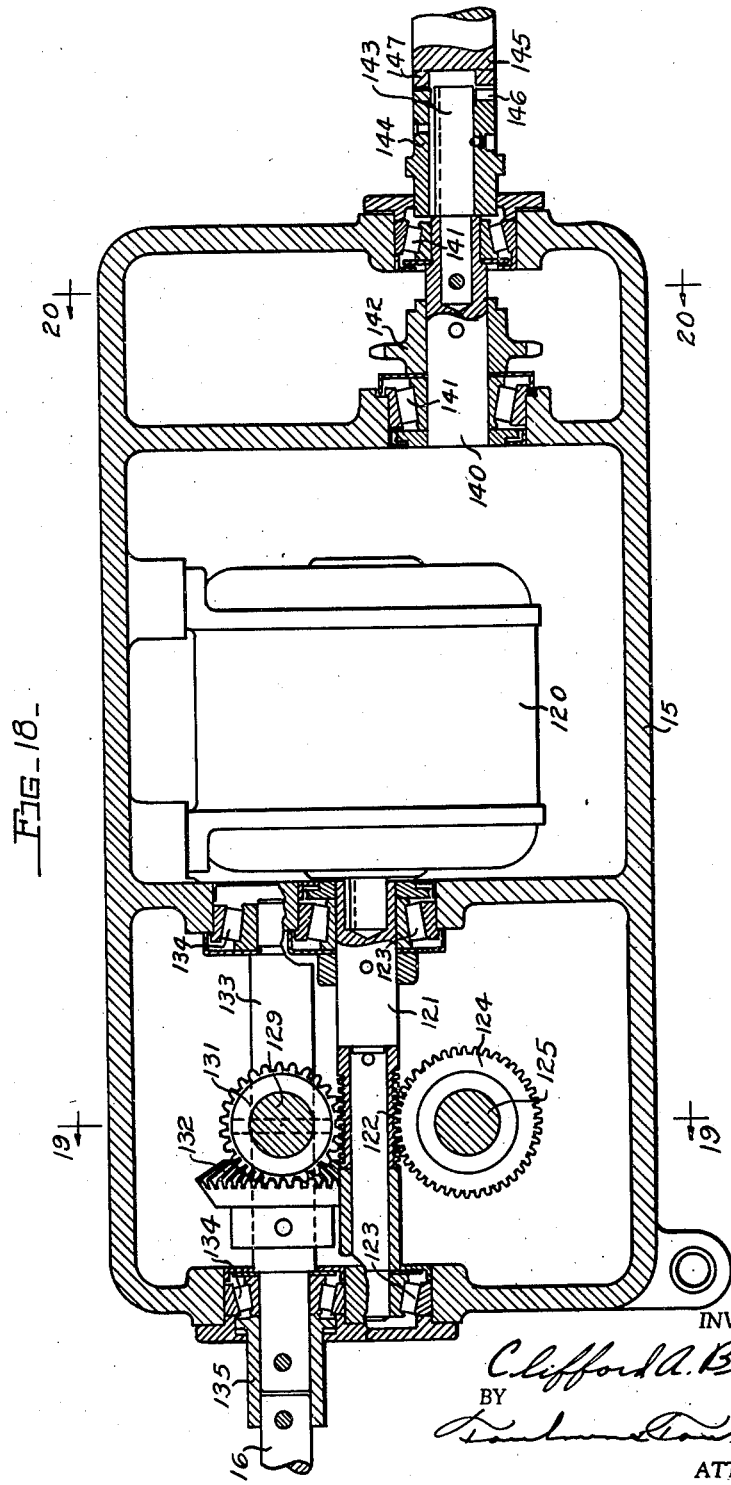

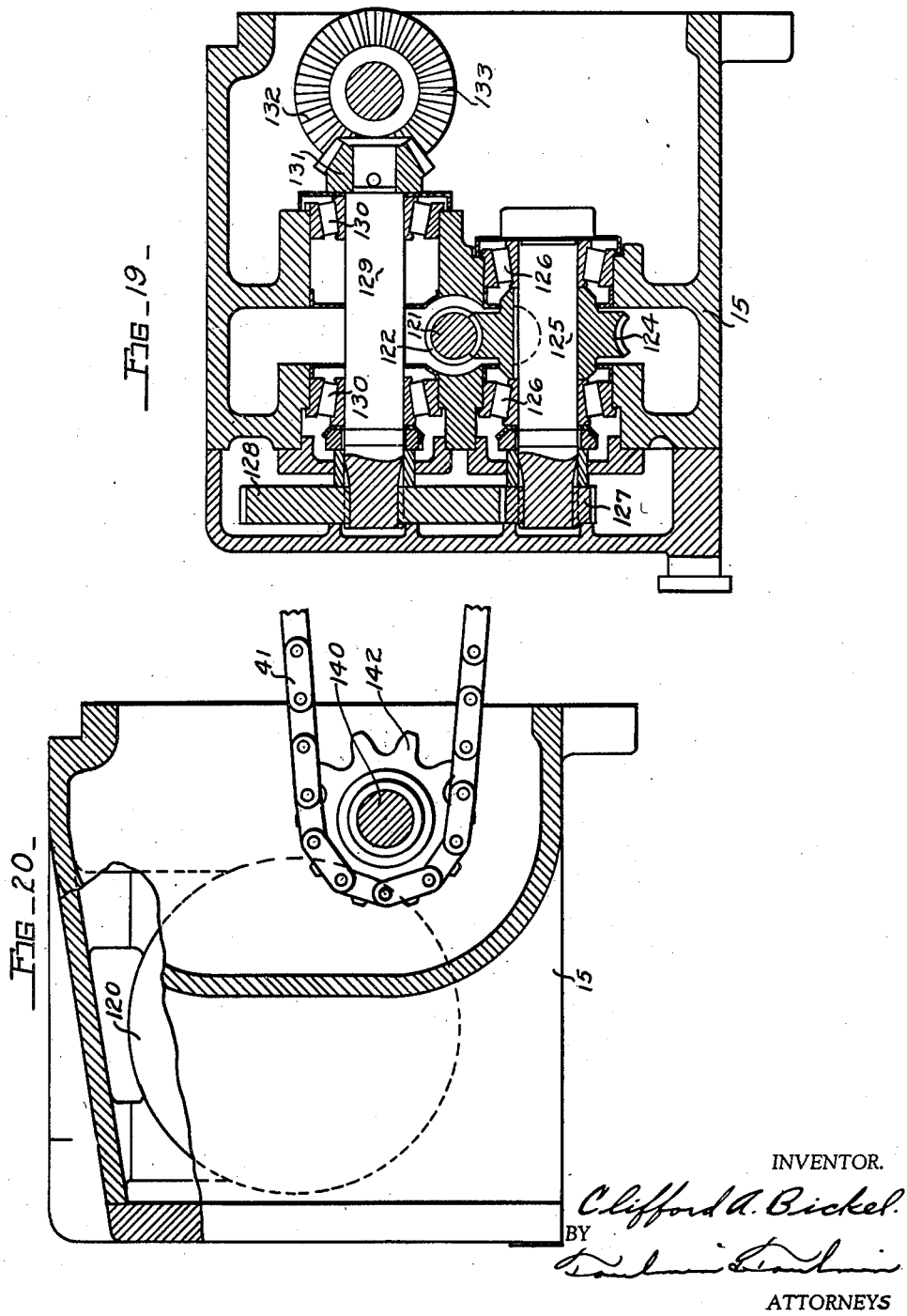

Sept. 22, 1936.　　　C. A. BICKEL　　　2,055,227
MOTOR AUTOMATIC LATHE
Filed Jan. 8, 1934　　　27 Sheets-Sheet 15

INVENTOR.
Clifford A. Bickel
BY
ATTORNEYS.

Sept. 22, 1936.　　　　C. A. BICKEL　　　　2,055,227
MOTOR AUTOMATIC LATHE
Filed Jan. 8, 1934　　　27 Sheets-Sheet 19

CLIFFORD A. BICKEL, Inventor

Sept. 22, 1936.  C. A. BICKEL  2,055,227
MOTOR AUTOMATIC LATHE
Filed Jan. 8, 1934  27 Sheets-Sheet 20
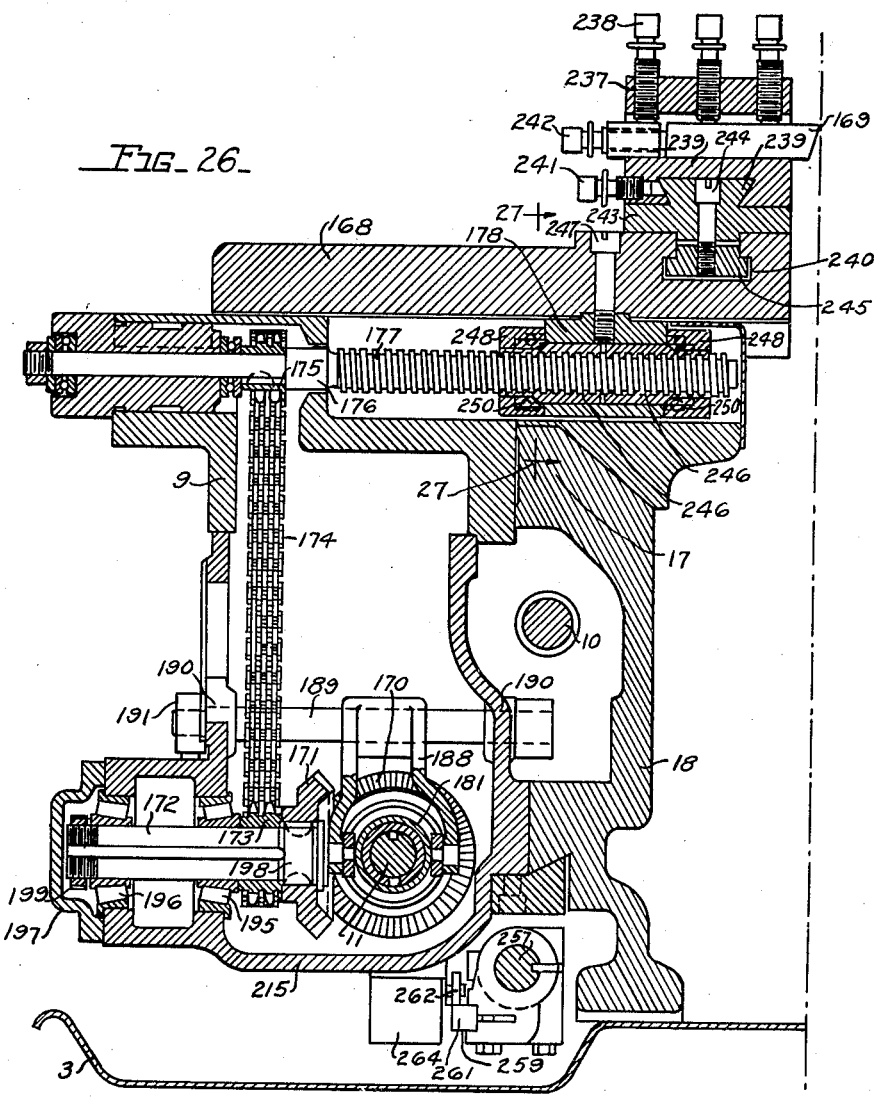
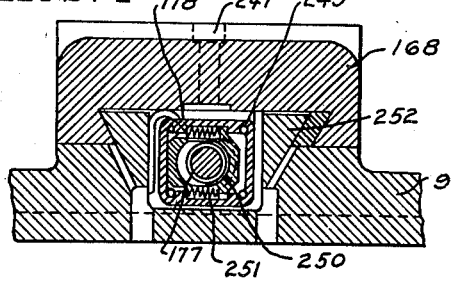
INVENTOR.
Clifford A. Bickel.
BY
ATTORNEYS Sept. 22, 1936.　　　　C. A. BICKEL　　　　2,055,227
MOTOR AUTOMATIC LATHE
Filed Jan. 8, 1934　　　27 Sheets-Sheet 21

Inventor
CLARENCE A. BICKEL,

Sept. 22, 1936.    C. A. BICKEL    2,055,227
MOTOR AUTOMATIC LATHE
Filed Jan. 8, 1934    27 Sheets-Sheet 22
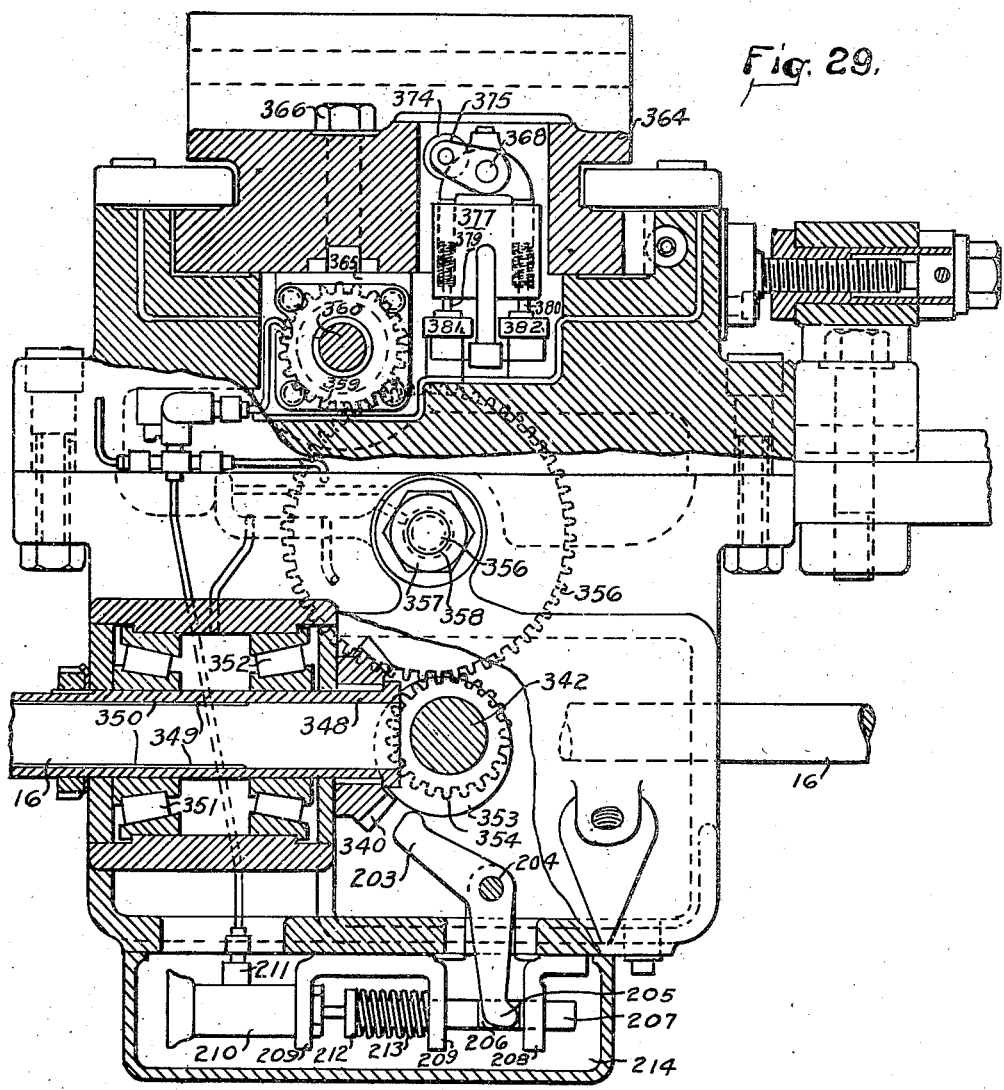
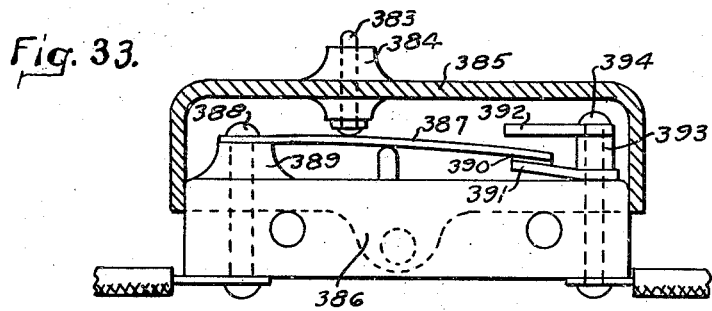

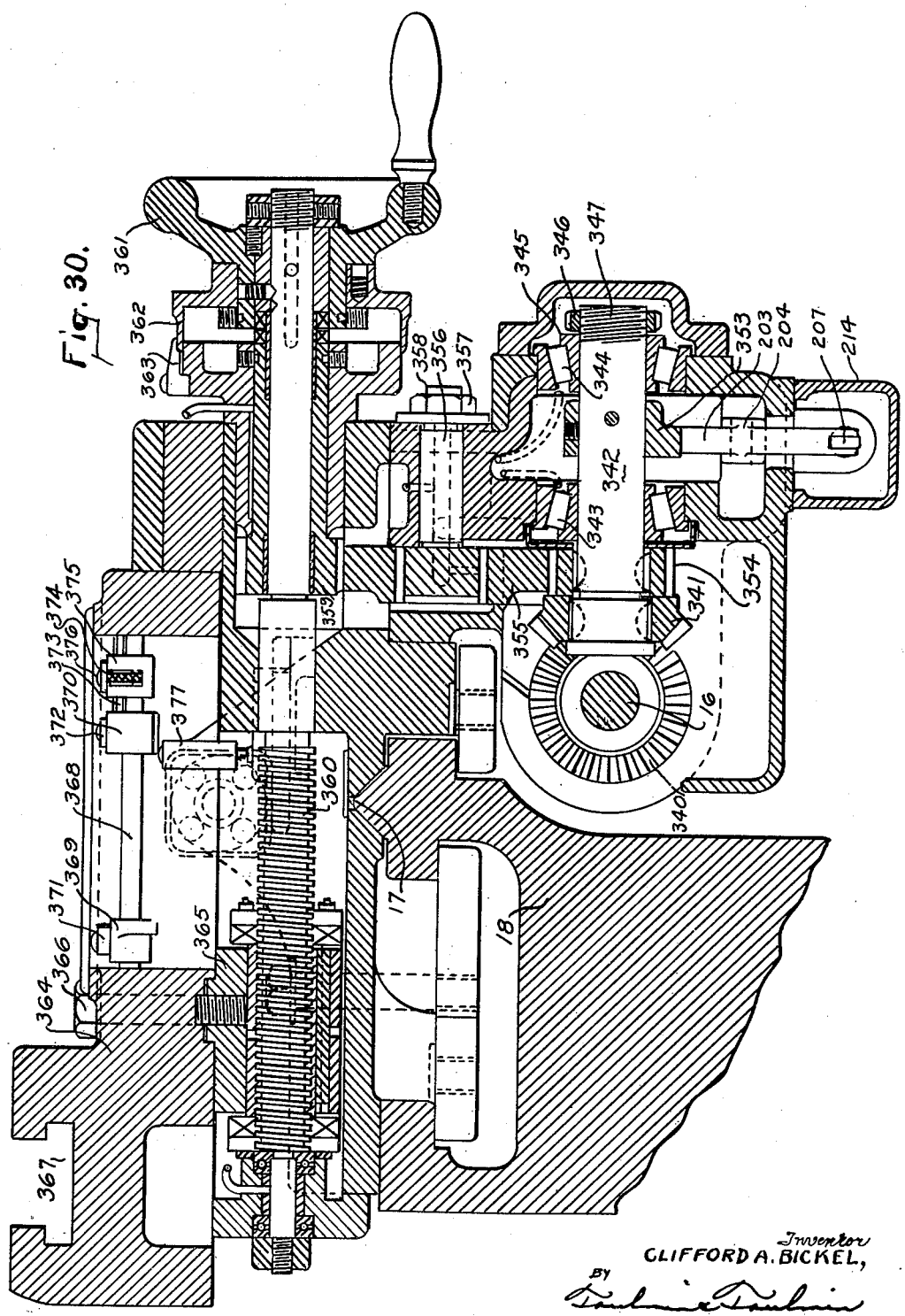

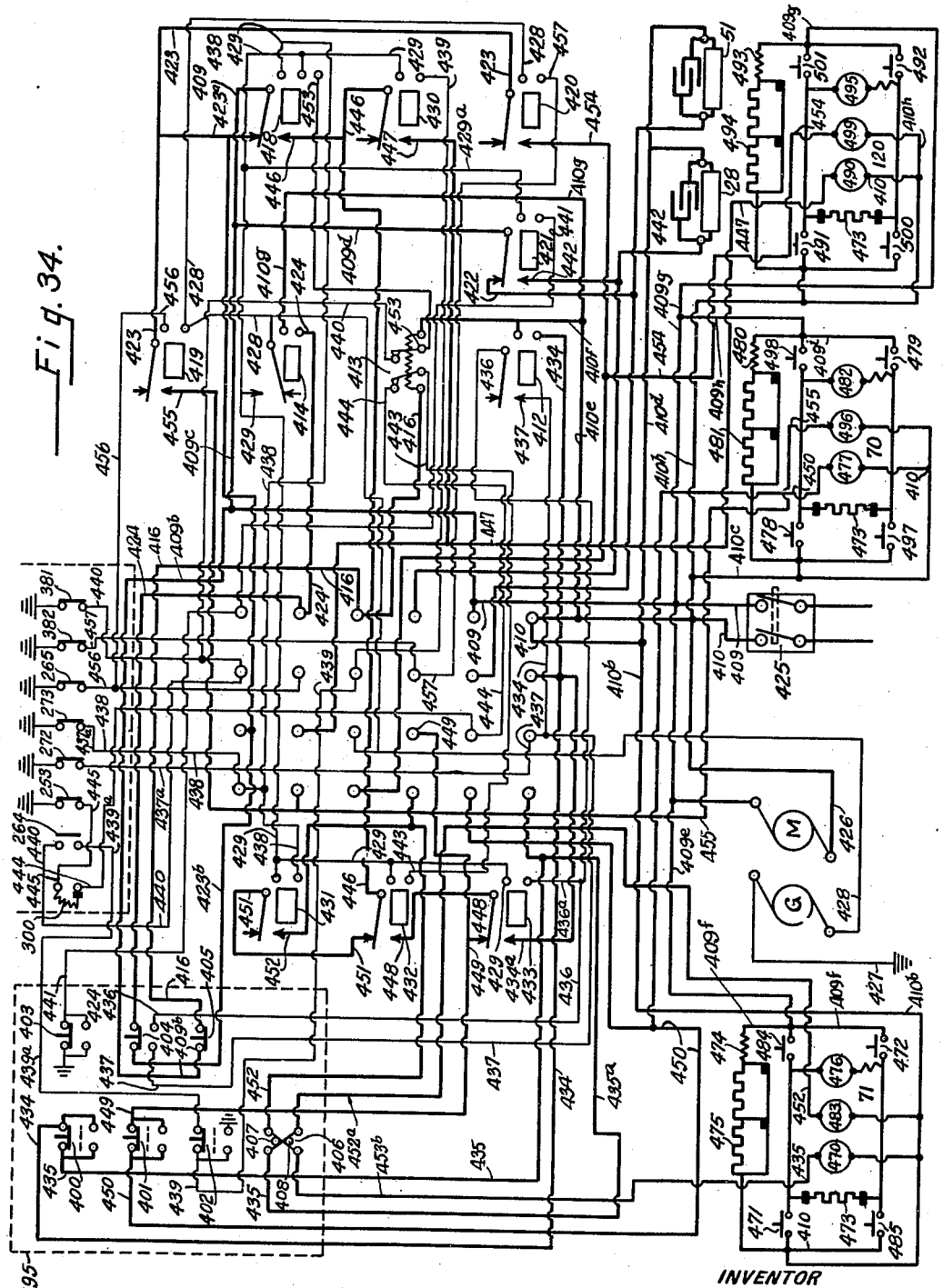

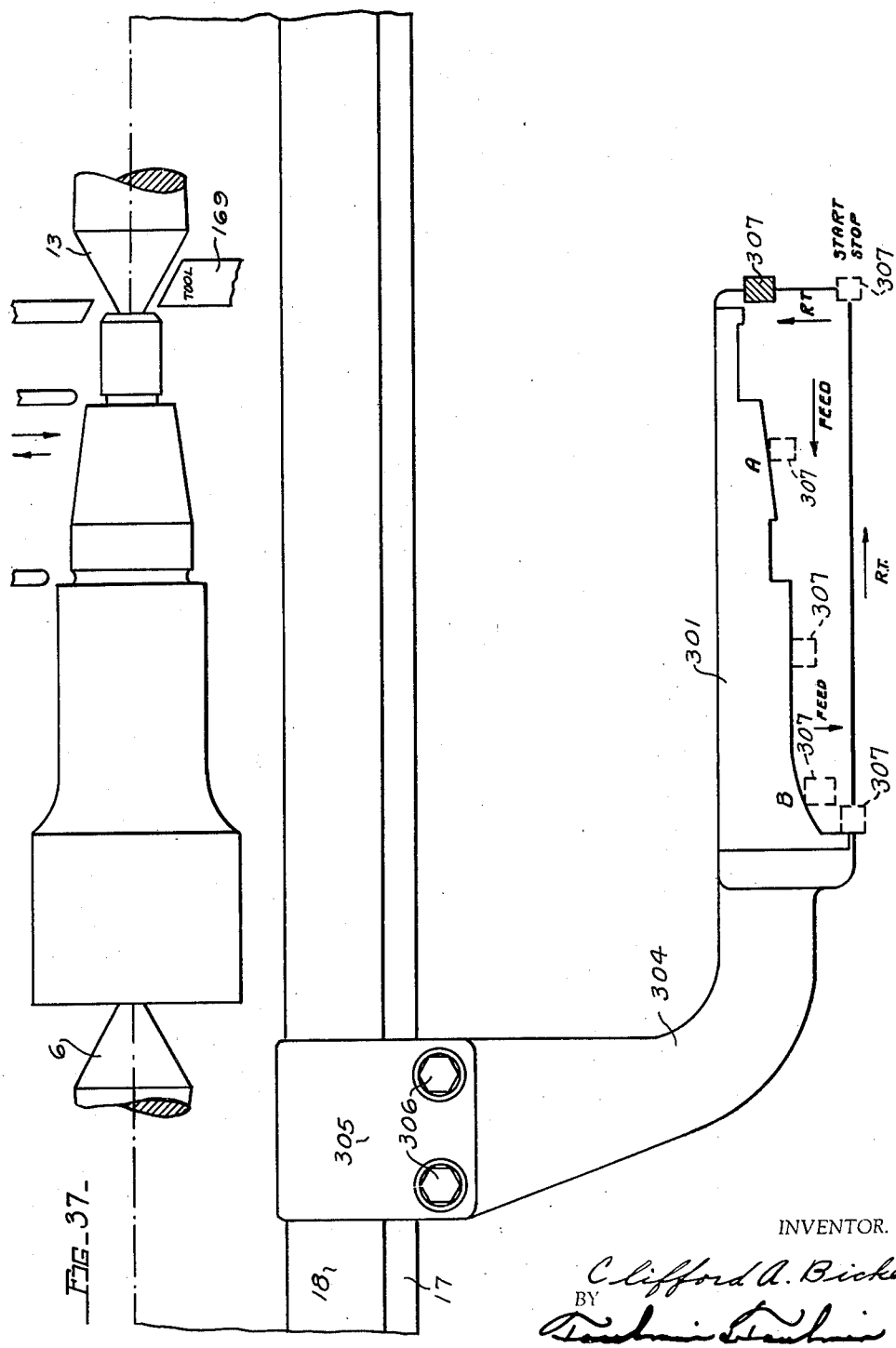

Sept. 22, 1936.  C. A. BICKEL  2,055,227
MOTOR AUTOMATIC LATHE
Filed Jan. 8, 1934  27 Sheets-Sheet 26
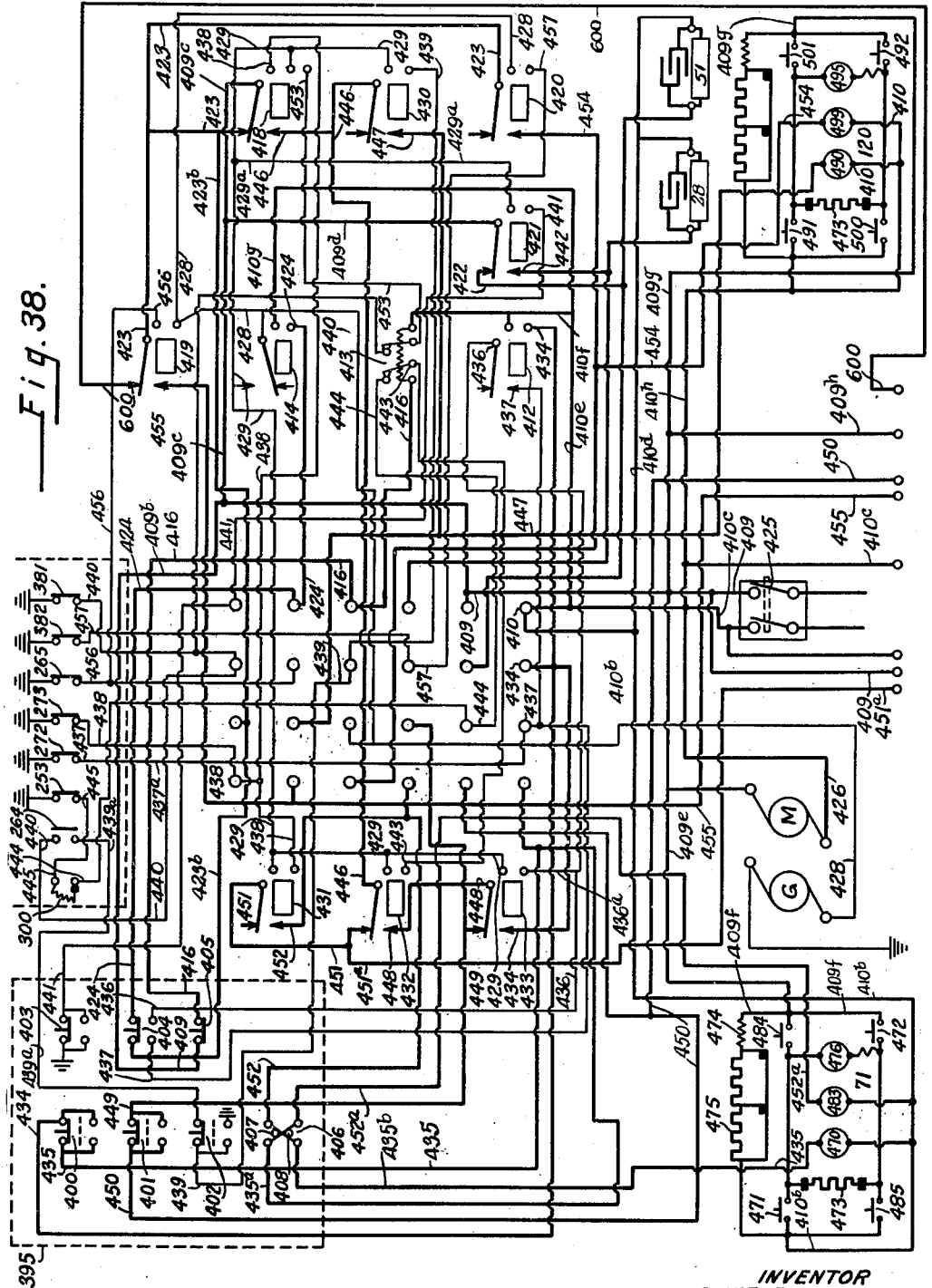
INVENTOR
CLIFFORD A. BICKEL.
BY
ATTORNEYS

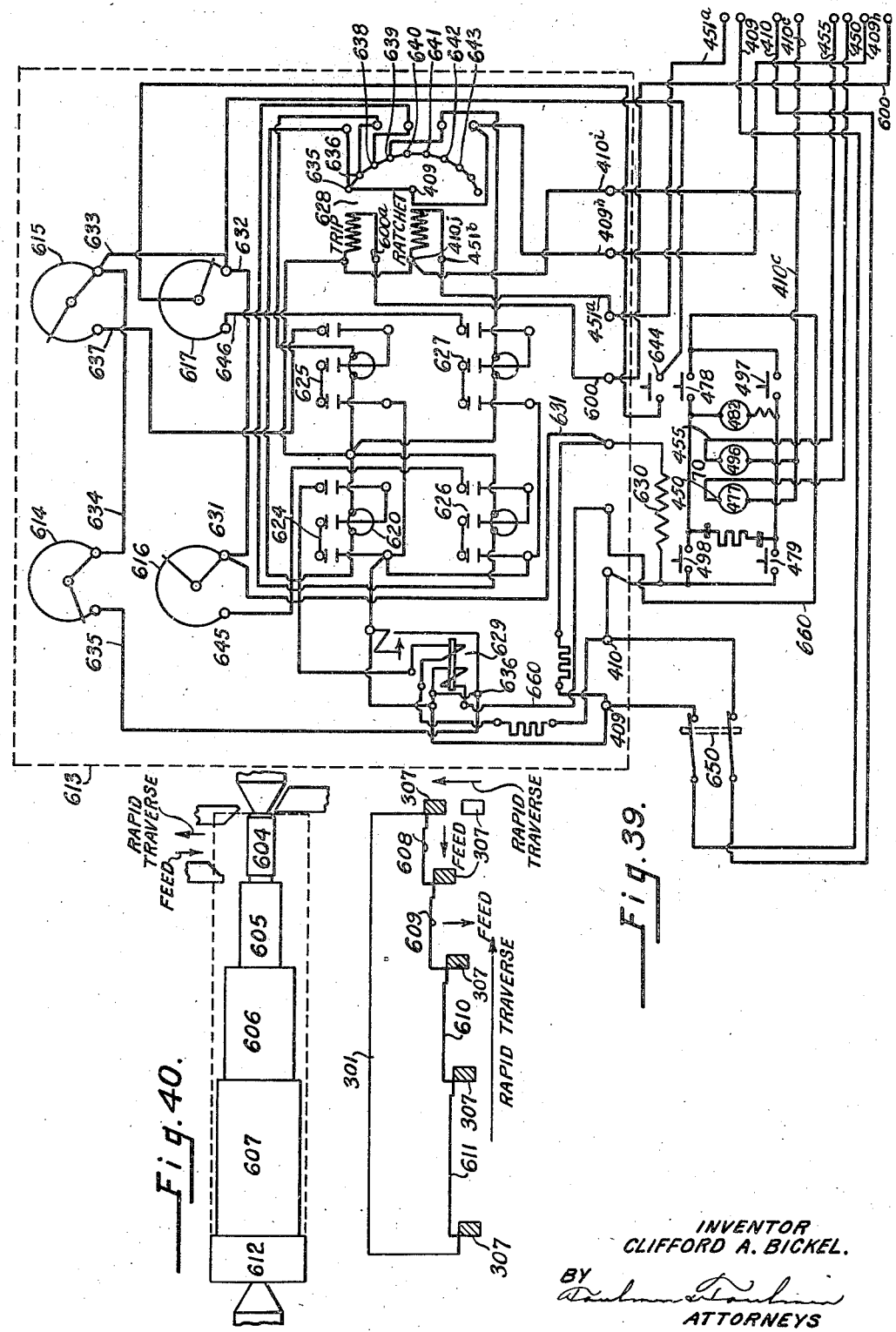

Patented Sept. 22, 1936

2,055,227

UNITED STATES PATENT OFFICE 2,055,227

MOTOR AUTOMATIC LATHE

Clifford A. Bickel, Sidney, Ohio, assignor to The Monarch Machine Tool Company, Sidney, Ohio, a corporation of Ohio Application January 8, 1934, Serial No. 705,765

39 Claims. (Cl. 82—2)

This invention relates to machine tools, and in particular to automatic lathes having provision for automatically controlling the operations of the cutting tools.

One object of my invention is to provide an automatic machine tool wherein the longitudinal and transverse motions of the cutting tool are actuated by individual motors.

Another object is to provide such a machine tool wherein these longitudinal and transverse motors are controlled by electrical means actuated during the motion of the cutting tool.

Another object is to provide such a machine tool wherein these longitudinal and transverse motors are started, stopped and/or reversed by electrical circuit breakers actuated by the motion of the carriage and/or cross slide thereof.

Another object is to provide such a machine tool and a control system therefor, whereby these longitudinal and transverse motors may be actuated by electrical controlling means regulated by a guiding member of suitable configuration.

Another object is to provide such a machine tool wherein these longitudinal and transverse motors are controlled by a template follower switch engaging a template between which relative motion occurs, the opening and closing of which switch actuates the transverse and longitudinal feeds according to the configuration of the template.

Another object is to provide such a machine tool having a carriage and cross slide adapted to be fed slowly in one direction and traversed rapidly in the opposite direction, with provision for reversal of these movements.

Another object is to provide a machine tool wherein the longitudinal and transverse motors are started, stopped and reversed by electrical means which have provision for interchanging the connections in such a manner that the in-feed controlling means may be arranged to operate the transverse motor in an out-feed direction, and the out-traverse controlling means may be adapted to operate the transverse motor in an in-traverse direction.

Another object is to provide a double-carriage automatic lathe wherein the feeding motor of the rear carriage is set in motion by electrical means actuated by the motion of the front carriage.

Another object is to provide a machine tool with means for interchanging the electrical connections of the cross slide actuating means, whereby the electrical means for controlling the rotation of the cross slide motor in one direction may be individually controlled by the controlling apparatus which normally actuates the cross slide motor in the opposite direction and vice versa.

Another object is to provide mechanical means of reversing the direction of rotation of the cross slide mechanism in conjunction with the previously described means of interchanging the electrical connections of the cross slide motor controlling means, whereby the in-feed controlling means will produce an out-feed effect upon the feeding motor and vice versa.

Another object is to provide such a machine tool having transverse and longitudinal feeds operated by separate reversible motors, these motors being adapted to be run more rapidly in a reverse traversing direction than in a forward feeding direction, with means for accomplishing such motion of the motors.

Another object is to provide such a machine tool having means for automatically changing the feeding speed to adapt it to the depth of cut necessary, without necessitating any attention on the part of the operator.

In the drawings:

Figure 1 is a front elevation of the automatic machine tool of my invention.

Figure 2 is a top plan view of my automatic machine tool.

Figure 3 is a left end elevation thereof.

Figure 4 is a longitudinal section through the pump shaft and headstock drive pulley shaft of my automatic machine tool.

Figure 5 is an enlarged longitudinal section through the main driving clutch and brake, along the line 5—5 of Figure 2.

Figure 6 is a transverse section through the headstock gear box along the line 6—6 of Figure 2.

Figure 7 is an irregular vertical section through the headstock gearing, taken in such a manner as to show the various machine elements arranged side by side to show their operative relationship in a connected sequence.

Figure 8 is a cross section through the tailstock mechanism, along the line 8—8 of Figure 1.

Figure 9 is a longitudinal section through the tailstock mechanism, along the line 9—9 of Figure 8.

Figure 10 is a side elevation of the tailstock.

Figure 11 is a longitudinal section through the front gear box mechanism, showing the longitudinal and transverse motors with their connected elements laid out side by side to show their operative arrangement.

Figure 21:
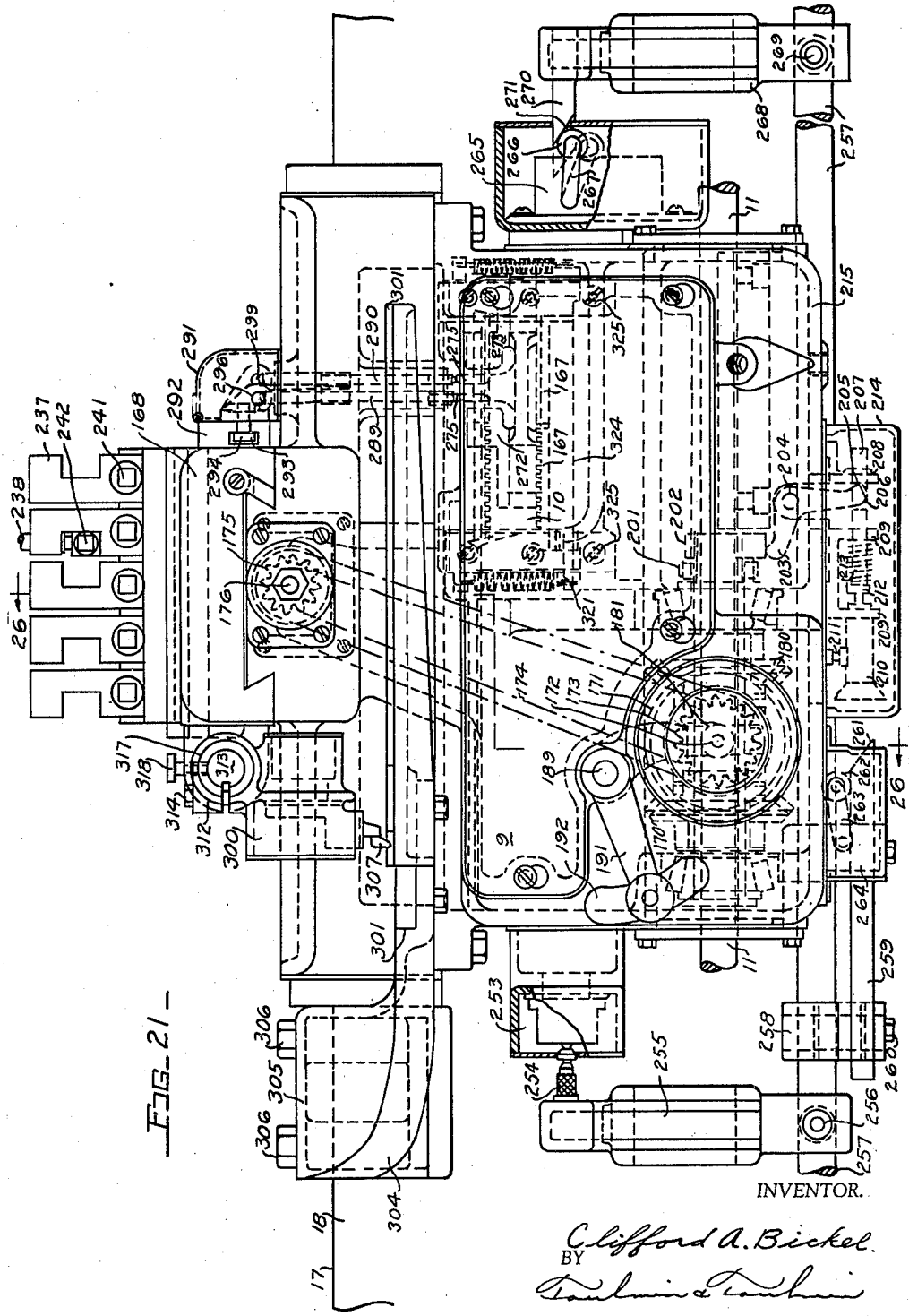

| of the wiring diarepresentation of
and template fol-
pped work pieces
the feeding speed,
res 38 and 39.

*tion*

. detail, the auto-
ntion is here rep-
ation to a lathe,
obviously applica-
included within
ly automatic ma-
1 and 2 connected
e former contain-
entilation for the
contained therein.
with a headstock,
; the live spindle
piece being ma-
ovided with gear-
he headstock gear
ool likewise has a
ated 8 (Figure 2),
the front carriage,
;h the front lead
od 11. My auto-
ed with the usual
1 12, having the
site the live spin-
the opposite end
ned.
1 with a rear car-
, and a rear gear
power being com-
he former through
od 16. The front
;e 14 are mounted
the latter having
nd of the machine
hanism is provided
e clutch guard 19.

*anism* natic machine tool
it therein contains
Figure 3) which is
-grooved pulley 21
ismitting power to
ey 24 having V-
illey 24 is provided
ng the brushes 26
27. The opposite
he magnetic clutch
by the machine
the clutch friction
ngages one face of
other face of which
32 associated with
bolted to the hous-
t 36 is operatively
e disk 31 by means
the inner races of
e outer races rotat-
he pulley 24. The Figure 12 is a transverse section through the front gear box along the line 12—12 of Figure 11.

Figure 13 is a transverse section through the front gear box along the line 13—13 of Figure 11.

Figure 14 is a longitudinal view, partly in section, through the front lead screw, box and brake, taken along the line 14—14 of Figure 2.

Figure 15 is an end elevation of the front lead screw box and brake shown in Figure 14.

Figure 16 is an end elevation of the rear feed rod box.

Figure 17 is a front elevation of the rear feed rod box.

Figure 18 is a longitudinal section through the rear gear box, showing the rear transverse motor and its connected machine elements.

Figure 19 is a transverse section through the rear gear box, taken along the line 19—19 of Figure 18.

Figure 20 is a transverse section through the rear gear box, taken along the line 20—20 of Figure 18.

Figure 21 is a front elevation, partly in section, of the front carriage and the neighboring structure.

Figure 22:
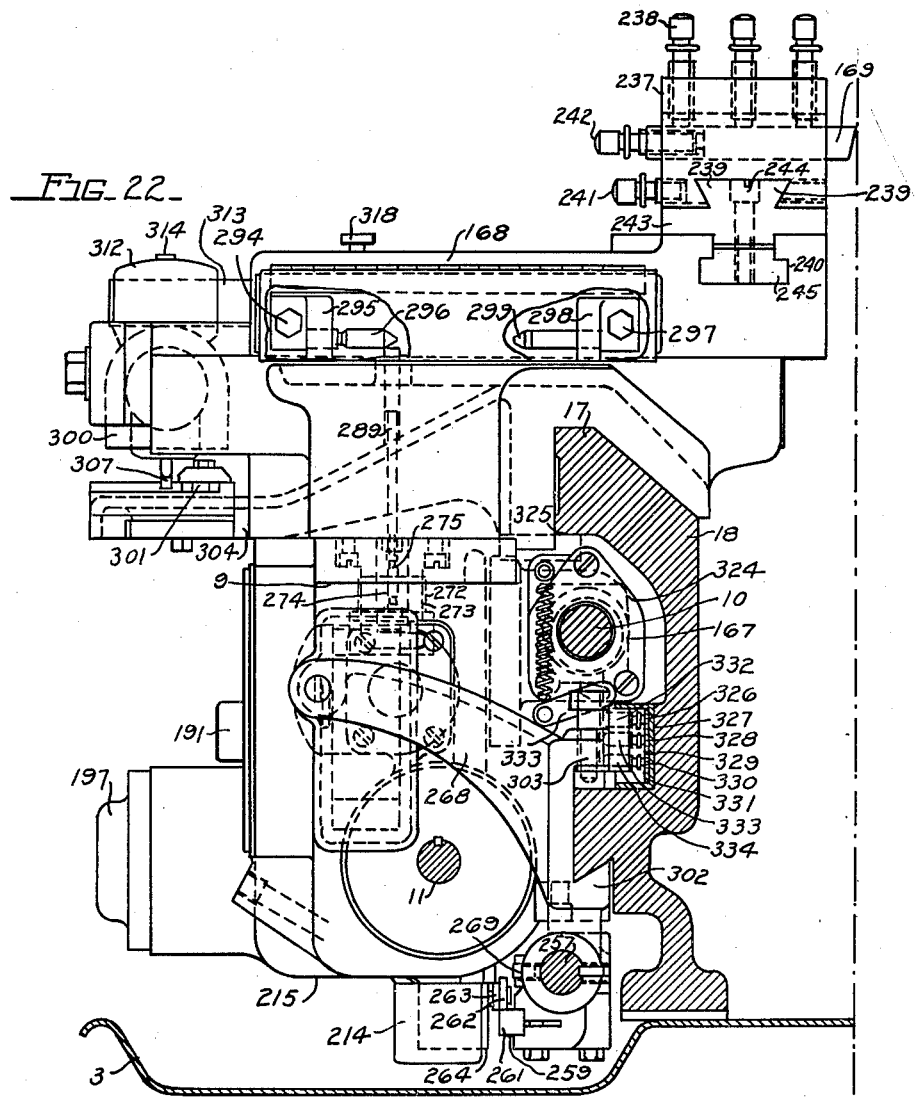

Figure 22 is a side elevation, partly in section, of the front carriage and its adjacent structure.

Figure 23:
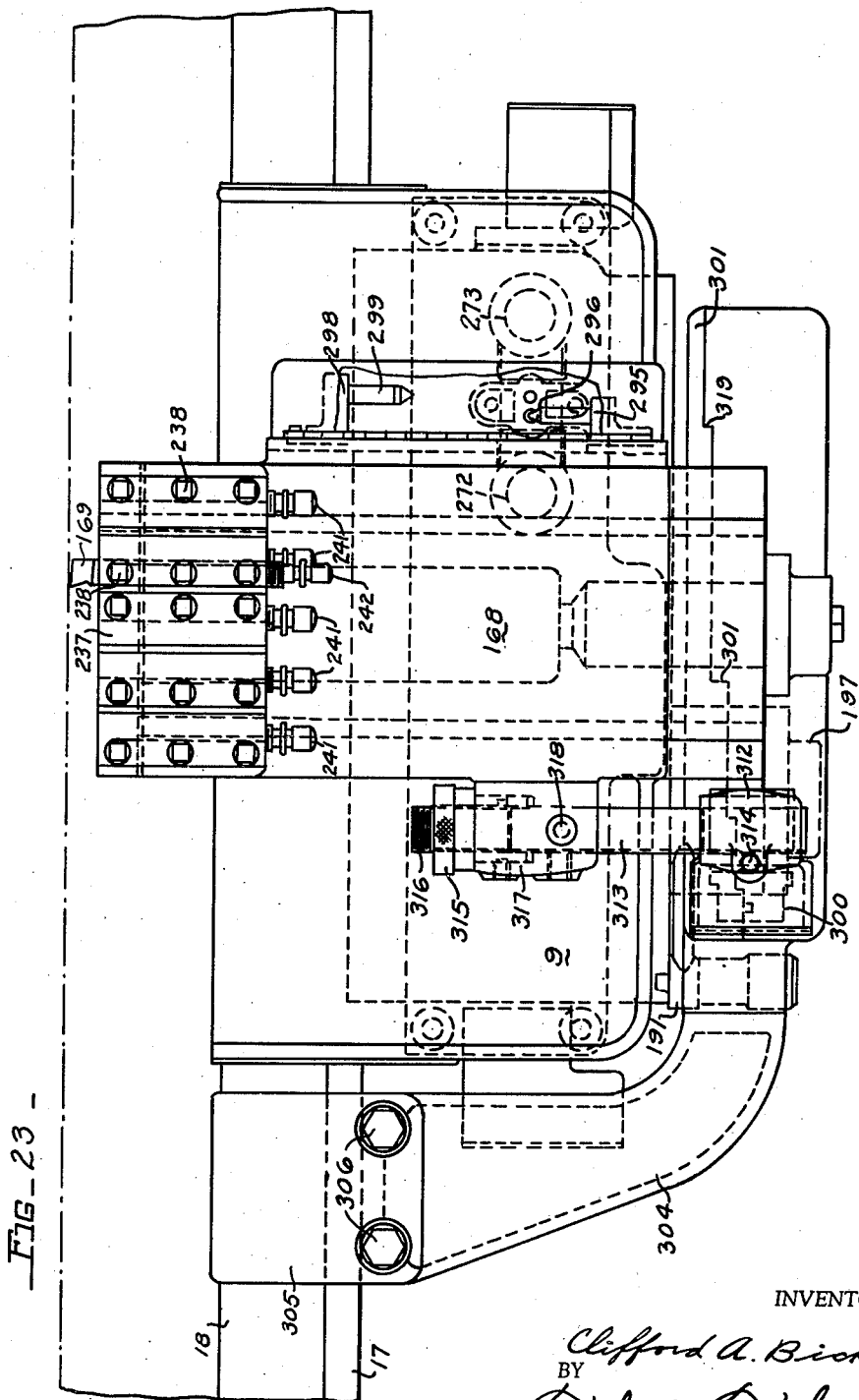

Figure 23 is a top plan view of the front part of the front carriage and its adjacent structure.

Figure 24:
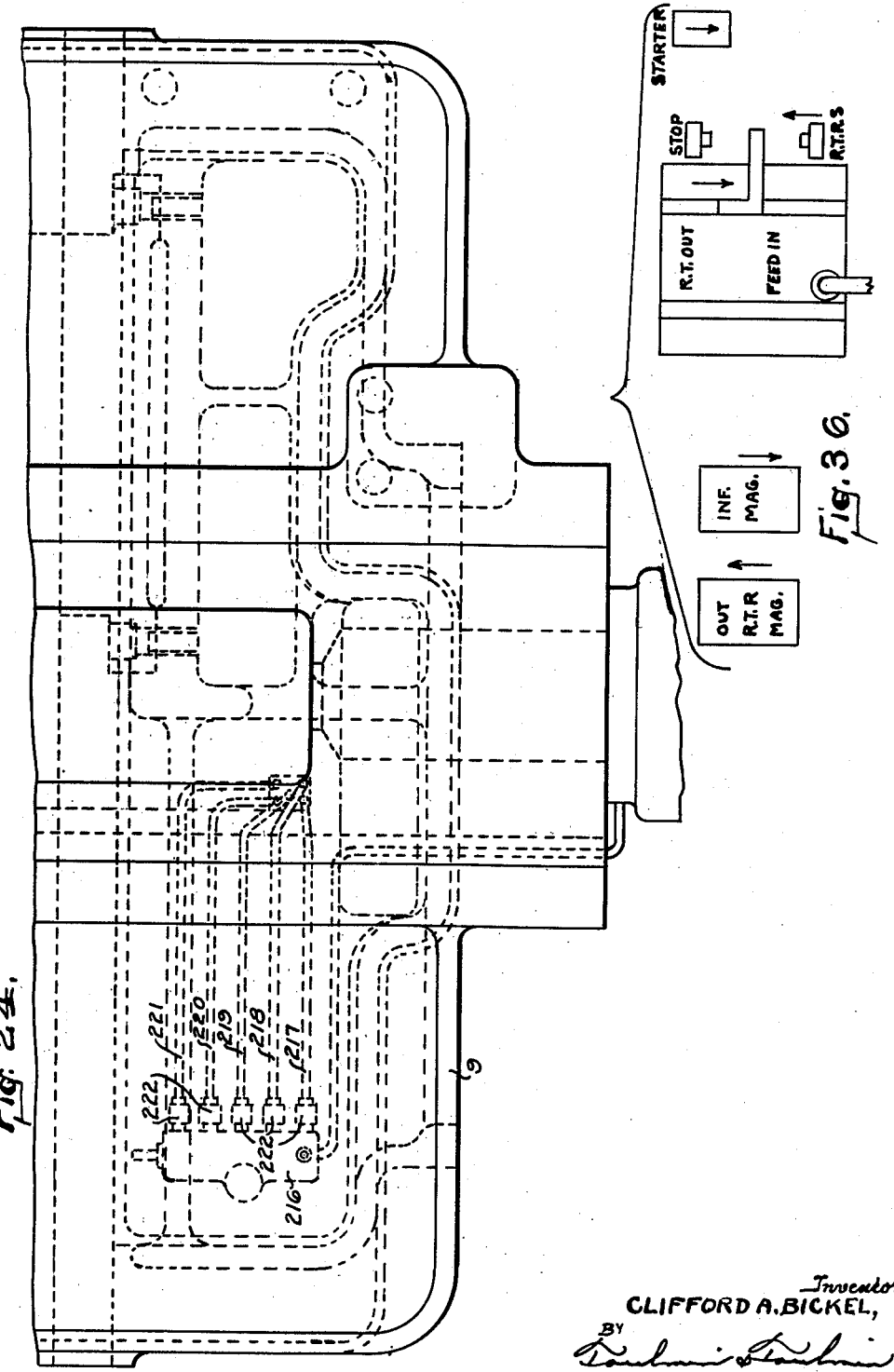

Figure 24 is a top plan view of the front carriage with a portion of the super-structure removed in order to show diagrammatically the arrangement of the oiling system, in dotted lines.

Figure 25:
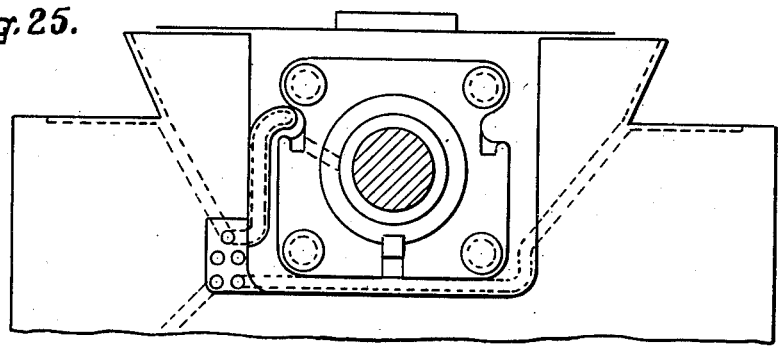

Figure 25 is an end view of the cross slide oiling arrangement.

Figure 26 is a vertical transverse section through the front carriage along the line 26—26 of Figure 21.

Figure 27 is a transverse section through the front carriage cross slide along the line 27—27 of Figure 26.

Figure 28:
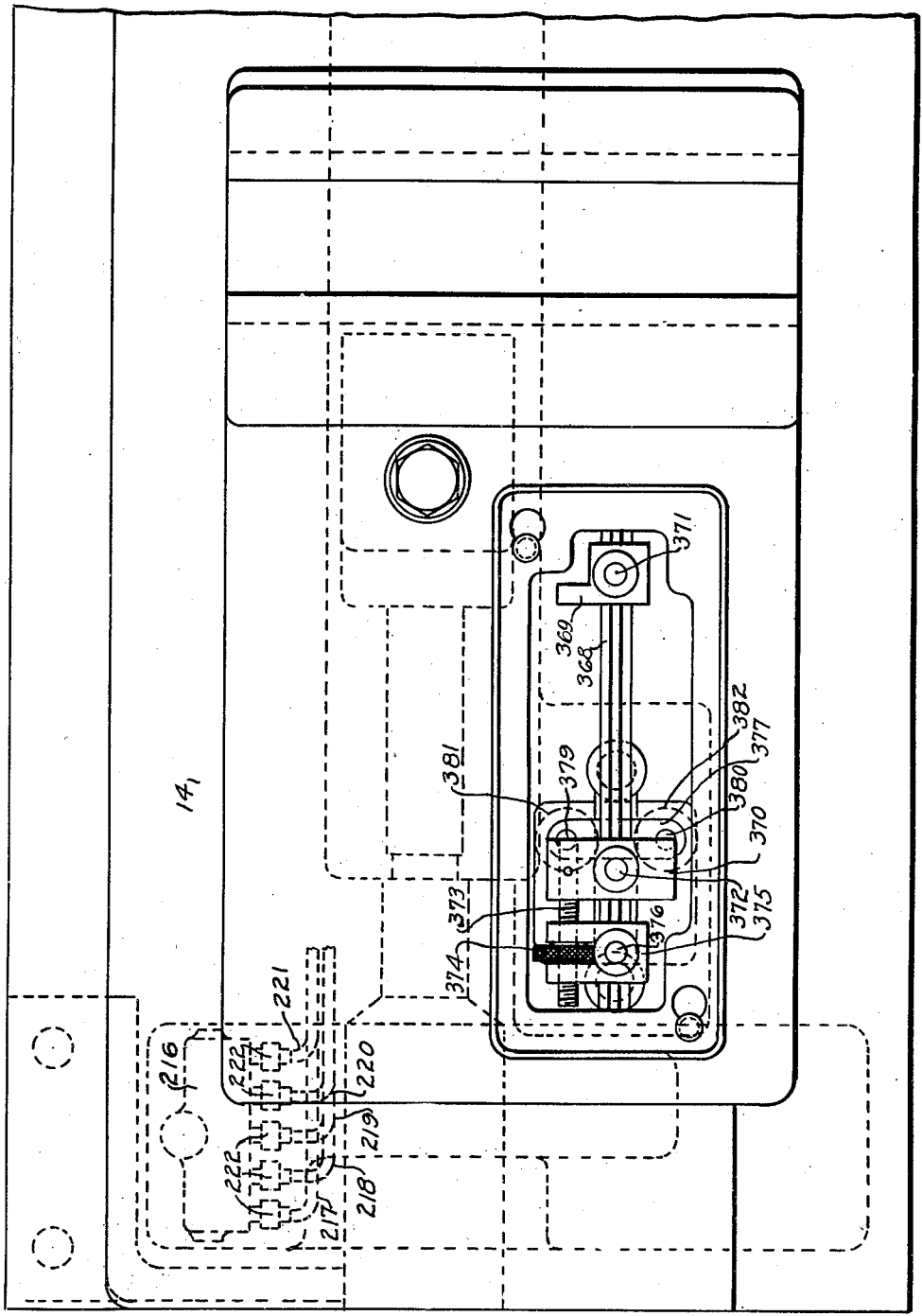

Figure 28 is a top plan view of the rear carriage, with part of the cover removed to show the oiling system, in dotted lines.

Figure 29 is a longitudinal view, partly in section, through the rear carriage mechanism, along the line 29—29 of Figure 2.

Figure 30 is a transverse section through the rear carriage mechanism, along the line 30—30 of Figure 2.

Figure 31:
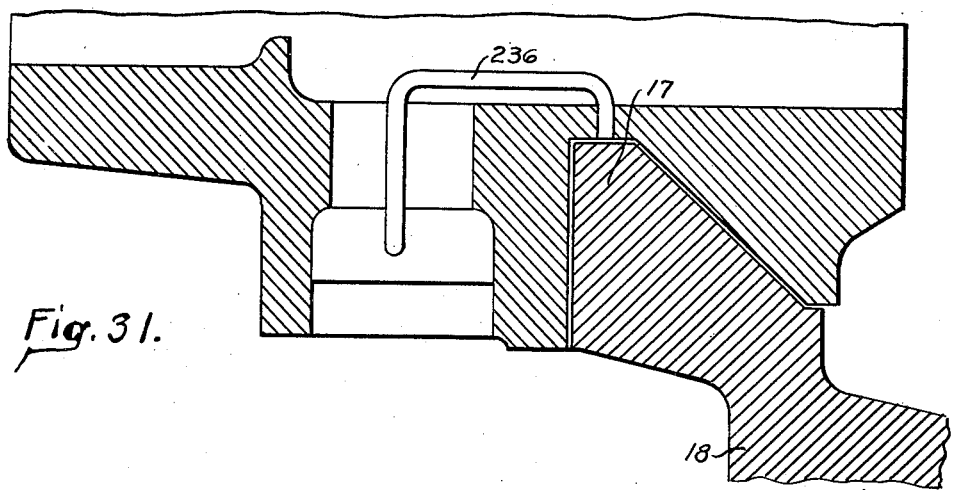

Figure 31 is an enlarged view showing the means of oiling the carriage ways.

Figure 32 is a longitudinal section through one of the metering oil connections.

Figure 33 is a section through one of the electrical switches which are started and stopped by the motions of the carriage and/or cross slide.

Figure 34 is a wiring diagram showing the electrical connections of the switches, relays, contactors, motors and other electrical apparatus used in my automatic machine tool.

Figure 35:
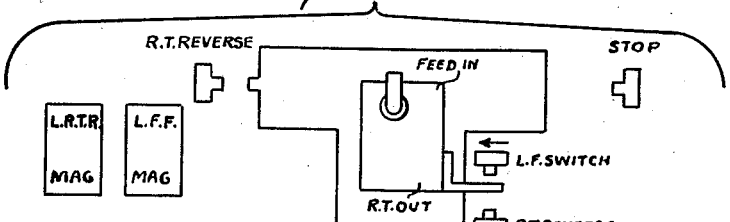

Figure 35 is a diagrammatic representation of the operation of the front carriage.

Figure 36 is a diagrammatic representation of the operation of the rear carriage.

Figure 37 is a diagrammatic representation of the operation of the template and follower switch Figure 39 is the second half of gram shown in Figure 38.

Figure 40 is a diagrammatic the operation of the template lower switch in machining ste with automatic adjustability of according to the circuit in Figu

*General construc*

Referring to the drawings in matic machine tool of my inver resented with particular applic although the system shown is ble to other machine tools and the scope of this machine. M chine tool has hollow base legs by the intermediate pan 3, the ing louvre panels 4 providing v motors and other mechanism ( The machine tool is provided generally designated 5, having 6 adapted to rotate the work chined. The headstock 5 is pr ing which may be shifted by tl shift lever 7. My machine to front gear box, generally design which communicates power to generally designated 9, throug screw 10 and the front feed r matic machine tool is provide tailstock, generally designated dead spindle 13 arranged oppo dle 6, and adapted to support of the work piece being machi My machine tool is provided riage, generally designated 14 box, generally designated 15, municated from the latter to tl the agency of the rear feed r carriage 9 and the rear carriag on a bed plate 18 (Figure 2), rapid ways 17. The lefthand e adjacent to the headstock mecl with a clutch contained in th

*Main driving mecl*

The base leg 2 of my auton is hollow, and the compartmer the main driving motor 20 (I provided with the multiple V engaged by the belts 22 tran the multiple V-grooved pull grooves 23 (Figure 5). The p with collector rings 25 engag mounted in the brush holder face of the pulley 24 contains t magnet 28 fastened thereto screws 29, which also secure disk 30 thereto. The latter e the intermediate disk 31, the is engaged by the braking disk the brake magnet 51 which is ing 34 (Figure 5). The shaf connected to the intermediate of the key 35, and supports anti-friction bearings 37 whos ably support the hub 38 of t chain 47. The latter transmits power to the spindle sprocket 48 mounted upon the first intermediate shaft 49, the latter being supported by anti-friction bearings 50 mounted in the casing. The first intermediate shaft 49 carries the pick-off pinion 52 which transmits power to the pick-off gear 53 on the second intermediate shaft 54, these gears being covered by the pick-off gear casing 55. (Figure 7.) The second intermediate shaft 54 is rotatably supported by the anti-friction bearings 56 and 57, and carries a pinion 59 slidably mounted thereon and keyed thereto by means of the fixed key 58. The pinion 59 is integral with the gear 60, the two being movable simultaneously by the shifter 61 engaged by the gear shifting yoke 62 mounted upon the shaft 63 and operated by the gear shifting lever 7 outside the casing. (Figures 7 and 1.) The right-hand end of the shaft 54 is mounted in the anti-friction bearing 65.

At one limit of its motion, the sliding pinion 59 meshes with the gear 66 keyed to the spindle shaft 6 which rotates the work piece. At the other limit of this motion, the gear 60 meshes with the pinion 67 which is likewise keyed to the spindle shaft 6. (Figures 6 and 7.)

*Front gear box*

The front gear box 8 (Figures 11, 12 and 13) contains a front longitudinal motor 70 and a front transverse motor 71. The front longitudinal motor 70 actuates the front carriage to move it longitudinally, either in a feeding direction toward the left, or reversely in a rapid-traversing direction to the right. The front transverse motor 71, on the other hand, actuates the cross slide of the front carriage, either to feed it inward or to rapid-traverse it outward. The last described arrangement may be reversed, as will be seen later, so that the front transverse motor 71 may, if desired, rapid-traverse the cross slide inward, and feed it outward.

The motor shaft of the front longitudinal motor 70 is keyed to the shaft 72, the latter of which is supported in antifriction bearings 73. To the shaft 72 is pinned the worm 74 which meshes with a worm gear 75 pinned to the lower cross shaft 76 (Figures 11 and 12).

The lower cross shaft 76 is supported in anti-friction bearings 77 at each end thereof. Keyed to one end of the lower cross shaft 76 (Figure 12) is a pinion 78 which meshes with a gear 79 keyed to the upper cross shaft 80. The latter is mounted in antifriction bearings 81 and is provided at its free end with a bevel pinion 82 pinned thereto.

The bevel pinion 82 meshes with the bevel gear 83 which is pinned to the intermediate longitudinal shaft 84 (Figure 11). The latter shaft is mounted in antifriction bearings 85, and at one end carries the pinion 86 pinned thereto and meshing with the gear 87 pinned to the upper longitudinal shaft 88. The latter shaft is mounted in antifriction bearings 89 and terminates in a reduced portion 90 which is pinned to the coupling collar 91. Also pinned to the coupling collar 91 is the front carriage lead screw 10 (Figure 11).

The motor shaft of the front transverse motor 71 is keyed to the shaft 95 to which is pinned the worm 96. This mechanism is held in alignment by the antifriction bearings 97 on either side of the worm 96.

The worm 96 meshes with a worm gear 98. The worm gear 98 is pinned to the upper cross shaft 99 which is supported at either end in the antifriction bearings 100. To one end of the upper cross shaft 99 is keyed the pinion 101 which meshes with the gear 102 keyed to the lower cross shaft 103 (Figure 13). The latter is supported in antifriction bearings 104, and its opposite end carries the bevel gear 105 pinned thereto.

The bevel pinion 105 meshes with the bevel gear 106 (Figures 11 and 13) which is pinned to the intermediate shaft 107. The intermediate shaft 107 is supported by the antifriction bearings 108, and at its opposite end carries the pinion 109 pinned thereto. The pinion 109 meshes with the gear 110 which is pinned to the lower longitudinal shaft 111. The latter is supported by antifriction bearings 112, and carries at its opposite end the pinion 113 pinned thereto. The pinion 113 meshes with the gear 114 whose hub 115 is secured to the front feed rod 11 by the key 116.

*Rear gear box*

The rear gear box 15 (Figures 18, 19 and 20) is provided with a rear transverse motor 120 whose motor shaft is keyed to the shaft 121 which carries the worm 122 pinned thereto. The shaft 121 is supported at its opposite ends in antifriction bearings 123.

The worm 122 meshes with a worm gear 124 which in turn is keyed to the lower cross shaft 125, which is supported by the antifriction bearings 126. To one end of the lower cross shaft 125 is keyed the pinion 127, which meshes with the gear 128 likewise keyed to the upper cross shaft 129. (Figure 19.) The upper cross shaft 129 is supported in antifriction bearings 130. To one end of the upper cross shaft 129 is pinned the bevel pinion 131 meshing with the bevel gear 132. The bevel gear 132 is pinned to the longitudinal shaft 133 which is supported by the antifriction bearings 134 at each end thereof. The outer end of the longitudinal shaft 133 is pinned to the coupling collar 135, to which the rear feed rod 16 is likewise pinned. (Figure 18.)

The rear gear box likewise contains the jack shaft 140 which is supported in the antifriction bearings 141 at its opposite ends. The jack shaft 140 carries the sprocket 142 keyed thereto. The sprocket 142 is driven by the chain 41 from the sprocket 40 on the main shaft 36. (Figures 3 and 20.) Pinned to the pack shaft 140 is a coupling shaft 143, to the opposite end of which is keyed the clutch collar 144. (Figure 18.) Arranged oppositely to the clutch collar 144 is the clutch member 145 adapted to engage the clutch collar 144 between the inter-meshing teeth 146 and 147 when the clutch is shifted. The clutch member 145 is connected to an oil pump (not shown), forming a part of the force-fed lubricating system for the work and tools.

*Front carriage mechanism*

The front carriage and its mechanism (Figures 21, 22 and 23) are moved longitudinally by the lead screw 10 engaging the nut 167. The lead screw 10 govern the longitudinal motion of the front carriage as controlled and limited by the electrical apparatus hereinafter described. The transverse motion of the front cross slide 168 and its tool 169 is governed by the front feed rod 11. The latter passes loosely through the beveled gear 170 which meshes with the bevel pinion 171 (Figure 26) on the transverse jack shaft 172. The shaft 172 carries a double sprocket 173 driving a chain 174 which transmits power to the double sprocket 175 mounted on the front cross slide actuating shaft 176. The front cross slide actuating shaft has the cross slide screw 177 which engages the nut 178 carried by the front cross slide 168. This mechanism causes the front cross slide 168 to move in or out.

The direction of rotation of the transverse jack shaft 172 and sprocket 173 (Figure 26) may be reversed by means of the bevel gear 180 (Figure 21) which is also loosely mounted on the feed rod 11 and which also engages the bevel gear 171 mounted on the transverse jack shaft 172. The power is transmitted from the feed rod 11 to either of the bevel pinions 170 or 180 by means of the sliding clutch member 181 (Figures 20 and 23) which is movable to and fro longitudinally to connect either of the bevel pinions 170 or 180 with the feed rod 11, the clutch member 181 having crown teeth which engage corresponding crown teeth on the hubs of the bevel pinions 170 or 180 respectively. The sliding clutch member 181 is moved to and fro by the yoke 188 which is carried by the yoke shaft 189 (Figure 26), the latter being mounted in bearings 190 mounted in the front carriage housing. The forward end of the yoke shaft 189 is provided with the shifting lever 191 which engages a quadrant 192 (Figure 21) in any one of three positions. These positions respectively determine whether the clutch member 181 shall be in neutral, operatively engaging the pinion 170 to drive the transverse jack shaft 172 in a forward direction, or engaging the pinion 180 to give a reverse direction of rotation thereto. The transverse jack shaft 172 is mounted in antifriction bearings 195 and 196, access being given thereto by the removal of the detachable front plate 197 (Figure 26). The transverse jack shaft 172 is provided at its inner end with an enlarged portion 198 and at its outer end by a removable retainer 199.

Associated with and driven by the front feed rod 11 is the cam 202 (Figure 21) which engages the bell crank 203 mounted upon the fulcrum shaft 204. The opposite ends 205 of the bell crank 203 engage an annular slot 206 in the pump shaft 207 which is reciprocably mounted in the brackets 208 and 209. These brackets also support the pump cylinder 210 having an outlet conduit 211. The pump shaft 207 is provided with a collar 212 engaged by the coil spring 213 which forces it in one direction. If the feed rod 11 rotates (Figure 21), the cam 202 rotates eccentrically, causing the bell crank 203 to swing to and fro. This causes the lower end 205 of the bell crank 203 likewise to swing, reciprocating the pump shaft 207, and pumping oil outward through the outlet conduit 211 to the various parts of the carriage. The coil spring 213 forces the bell crank into constant engagement with the cam 202. The pump cylinder 210 and its neighboring parts are enclosed by the cover plate 214 attached to the bottom 215 of the front carriage casing, thus acting as a sump to contain lubricating oil.

As will be seen later, the rear carriage contains a similar oil pump with its parts similarly numbered. (Figures 29 and 30). The lubricant is pumped by these oil pumps to a suitable distribution manifold 216 for each carriage, the front carriage manifold 216 being shown in Figure 24, the rear carriage manifold 216 in Figure 28. Leading from the distribution manifold 216 are the individual feed pipes 217, 218, 219, 220 and 221. Associated with the lubricating system are metering oil connections 222 (Figure 32). Each contains a bore 223 having a conical flare 224 leading into an enlargement 225 containing filter wads 226. The latter are held in place by the end of the oil pipe 221 which is maintained in position by an enlarged portion 227 nesting into an annular collar 228 seated against one end of the metering oil connection 222. This is provided with a threaded portion 229 engaged by a threaded collar 230 in such a manner as to hold the enlarged portion 227 of the oil pipe 221 against the collar 228, and the latter against the casing end of the metering oil connection 222.

The small bore 223 of the metering oil connection 222 contains a restriction pin 231 fitting loosely therein and having a disk 232 integral therewith for reciprocation in a countersunk bore 233, this reciprocation being resisted by a coil spring 234 held in place by a plug 235. This assembly thus constitutes a relief valve for excessive pressure developing within the oil feed pipes, and likewise serves to meter out the oil in suitable amounts as demanded by the working conditions.

The carriage ways 17 are lubricated (Figure 31) by a pipe 236, through which lubricant passes from the oil distributing system to the ways. The details of the lubricating system form no part of the present invention, hence are not further discussed.

Returning again to the front carriage, it will be seen (Figures 22 and 26) that the front cutting tool 169 is held in a cutter head 237 by means of the screws 238 and the screw 242. The cutter head 237 is reciprocable longitudinally for adjustment purposes in the beveled ways 239 and the T-groove 240. This adjustment is tightened by means of the screw 241 operating against the beveled ways 239 of the base plate 243, which in turn is engaged by the screw 244 passing therethrough and threadedly connected to the nut 245 which rests in the T-slot 240. When the bolt 241 is tightened, the cutter head 237 and its base plate 243 are rigidly locked into fixed relationship with the cross slide 168 (Figure 26).

The front cross slide 168 carries the nut, generally designated 178, (Figure 26) joined thereto by the screw 247 (Figures 26 and 27). The nut 178 consists of a central portion 246 and end caps 248 bolted thereto by the screws 249 and containing the movable contact member 250. The latter is held in position against the crossfeed screw 177 by the coil springs 251. The two-piece nut 178 thus provides for automatic take-up of wear.

The movements of the front carriage feeds longitudinally right or left and transversely in or out are controlled by the previously described individual motors, whose actuation is controlled by a plurality of switches which are opened and closed by the movements of the carriage. The front carriage contains six such switches, and the rear carriage two thereof. On the left hand end of the front carriage (Figure 21) is located the front-left-feed switch 253. The follower button of the switch 253 is engaged by the limit stop arm 254 (Figure 21) which projects from the adjustable stop 255. The latter is attached by the bolt 256 to the longitudinal stop shaft 257.

Consequently when the front carriage moves sufficiently forward to the left that the push button of the switch 253 is engaged by the stop arm 254, the switch contact is thrown into open circuit, as hereinafter described.

The stop shaft 257 also carries an adjustable stop 258 near the stop 255. The stop 258 is clamped to the stop shaft 257 and carries a stop arm 259 longitudinally adjustable relative thereto by the screw 260. The stop arm 259 at its free end has a beveled portion 261 (Figure 21) which engages the roller 262 on the contact arm 263 of the rear carriage pick-up switch 264. Consequently, when the carriage arrives at a point opposite the beveled portion 261 of the stop arm 259, the roller 262 will be forced upward by the beveled portion 261, shifting the contact arm of the rear carriage pick-up switch 264, causing the rear carriage to come into action as will be described later.

The righthand end of the front carriage (Figure 21) carries the front-right-feed switch 265 having the roller 266 mounted on its contact arm 267. Mounted on the stop shaft 257 is the adjustable stop 268 which may be clamped in fixed position thereon by the bolt 269, in a similar manner to the stop 255 previously described. The stop 268 carries the adjustable stop arm 270 which has a beveled portion 271 adapted to engage the roller 266 of the front-right-feed switch 265. Consequently, when the front carriage moves sufficiently far to the right, the roller 266 and with it the contact arm 267 of the front-right-feed switch 265 will be forced downward by the beveled portion 271 of the stop arm 270, shifting the switch contacts in a manner hereinafter described. The stop shaft 257 is clamped by the bolt 269 to the stop shaft bracket 268 which in turn is clamped to the machine frame as at 302 (Figure 22).

The transverse feed of the front carriage is likewise provided with a pair of switches 272 and 273 for controlling the limits of movement of the cross slide inward and outward. (Figures 21, 23 and 22.) Each switch has an upwardly-projecting L-shape arm 274 with a follower button 275 at its upper end. The horizontal part of the switch arm 274 is pivoted in its mid-portion and at its opposite end within the switch casing carries contact points, these being held normally in engagement by a spring. The switches 272 and 273 are thus normally in closed circuit arrangement, the circuit being broken when the follower button 275 is pushed downward as described immediately below, this separating the contact points of the switch.

The front in-feed switch 272 and the front-out-feed switch 273 are both contained in the right-hand midportion of the interior of the front carriage (Figure 21), their switch arms 274 being horizontal with the follower buttons 275 pointing upward. The follower button 275 of the front in-feed switch 272 is engaged by a vertical push rod 289, whereas that of the front out-feed switch 273 is correspondingly engaged by a vertical push rod 290.

The upper ends of the push rods 289 and 290 have bearing support in the front carriage casing, and project upward into the interior of the cross slide stop housing 291. The latter is supported against the stop base 292, which is provided with a T-shaped slot 293 containing a T-bolt 294, the opposite end of which engages the in-stop 295 carrying the in-stop arm 296. In a similar manner the stop base 292 likewise carries the T-bolt 297 clamping thereagainst the out-stop 298 having the out-stop arm 299. The ends of both the out-stop and in-stop arms 296 and 299 are conical and are thereby adapted to engage the upper ends of the push rods 289 and 290 and force them downward when the stop arms are moving in a direction perpendicular to them.

When the cross slide 168 moves inward under the influence of the cross slide screw 177, the in-stop arm 296 moves inward and at a predetermined limit engages the push rod 289, forcing the latter downward, separating the switch contacts of the front in-feed switch 272 and opening the circuit therethrough. In a similar manner, when the cross slide 168 moves outward, the out-stop arm 299 eventually engages and forces downward the push rod 290, separating the contacts of the front out-feed switch 273, likewise opening the circuit therethrough. By adjusting the positions of the two stop arms 296 and 298, the forward and rearward motions of the cutting tool 169 may be accurately controlled.

A template follower switch 300 is additionally provided on the upper lefthand super-structure of the front carriage (Figures 21, 22 and 23). This template follower switch 300 controls the successive longitudinal and transverse feeds when work pieces are to be machined with stepped portions thereon. The template 301 attached to the template bracket 304 controls the operation of the template follower switch 300, whose follower button 307 engages the edge thereof. The template bracket 304 is secured to the machine frame by the clamp portion 305 and the bolts 306, whereby it may be adjusted longitudinally.

The template follower switch 300 is similar in construction to the switches 253, 272 and 273 previously described. The switch contacts thereof, however, are individually insulated from each other and from the remainder of the switch in such a way that current passing through them is completely independent of the current passing through the frame of the machine as a whole.

The template follower switch 300 is secured by the clamping member 312 to the switch supporting shaft 313, whereby the switch 300 may be moved in or out by loosening the clamping bolt 314 (Figures 21 and 23). A finer adjustment of this nature is provided by turning the knurled collar 315 operating on the threaded portion 316 of the switch supporting shaft 313. The latter passes through and is supported by the switch supporting shaft bracket 317, and is held in place by the thumb screw 318.

The front carriage is provided with a two-piece automatic wear-takeup nut 167 on the longitudinal feed screw 10, (Figures 21 and 22) similar in principle to the two-piece nut 178 on the cross feed screw 177 (Figures 26 and 27). The latter has already been described, and a repetition of the description for the longitudinal feed nut 167 therefor appears unnecessary. As wear occurs between the nut and the lead screw, the cam 321 which is held in place by the spring 322, will move the nut parts endwise. This forces the nut parts against the screw, taking up any clearance between the two. The various portions of the longitudinal feed nut 167 are supported on the plate 324 which in turn is secured to the carriage by the screws 325.

Electricity is conducted to the various switches on the front carriage from the frame of the machine in the manner shown in Figure 22. Insulatingly mounted upon the machine frame is a plurality of conductor bars 326, 327, 328, 329, 330, and 331, contact with which is made by the brushes 332, 333 and 334. The latter are insulated from one another and electrically connected to the various switches. Additional brushes (not shown) conduct electricity to the remaining

| | switches from the conductor bars 327, 329 and | the limit contacts 391 and 3!
|2, the latter being | 331. Thus as the front carriage moves longi- | separated by the post 393 an
d held against the | tudinally relative to the frame, electrical con- | switch base 386 by the scr
ew 394. Electrical | tact therebetween will nevertheless be maintained | conductors are attached to t
he bottom ends of | through the action of these brushes upon the | the screws 388 and 394.
 | conductor bars. |

*nism*

*Rear carriage mechanism*

*Tailstock mecha* signated 12, is lo-
ock spindle 6, and
rting the opposite
tailstock 12 (Fig-
pindle 13 which is
eve 335, the latter
the spur gear 336
ear 336 is mounted
is actuated by the
a manner that the
in or out by turn-
locked in position
The tailstock is ad-
e machine frame
aging the clamping
he nuts 398 at the
tes 397 engage the
in frame or bed of The rear carriage mechanism (Figures 28, 29 and 30) is similar to that of the front carriage in many of its features. The rear carriage 14 receives power from the rear feed rod 16 (Figures 29 and 30) through the agency of the sliding beveled pinion 340 engaging the beveled pinion 341 on the jack shaft 342. The latter is supported by antifriction bearings 343 and 344, in which it is held by its enlarged head 345 and threaded collar 346 engaging its threaded portion 347. (Figure 30.)

The beveled pinion 340 is attached to the collar 348 which engages the splines 349 in the feed rod 16 through the sliding keys 350, the entire assembly being supported upon antifriction bearings 351 and 352 (Figure 29). The jack shaft 342 carries a cam 353 which operates the rear carriage lubricating pump in a manner similar to that of the front carriage previously described, the same numerals being used for the pump mechanism of both carriages. The jack shaft 342 likewise carries a pinion 354 which engages the intermediate gear 355 rotating upon the stub shaft 356. The latter is held in position by the nut 357 engaging the threaded portion 358 thereof. The intermediate gear 355 meshes with the pinion 359 connected to the rear carriage cross feed screw 360. The latter is supported in the usual manner and has a hand wheel 361 for manual adjustment, the amount of which is indicated by the dial 362 and the index needle 363.

The tailstock, generally de
cated opposite to the headst
forms the dead center suppo
end of the work piece. The
ures 8, 9 and 10) carries a s
mounted within the rack sle
being adjusted to and fro by
engaging its rack. The spur g
on the vertical shaft 337 and
clamping handle 338 in such
tailstock spindle 13 is racked
ing the clamp 338 and then
by raising the same handle.
justable longitudinally of t
by loosening the bolts 396 eng
plates 397 at one end and t
other end. The clamping pla
slotted portions 399 in the ma
the machine.

*Push button switc*

*h panel* vention is provided
el 395 (Figure 34),
ally operated push
This push button
y mounted upon a
he respective con-
h may be arranged
ient for the reach
pper push buttons
s of the lathe car-
topping of the ma-
r buttons serve to The rear carriage cross slide 364 is actuated by the rotation of the rear carriage cross slide screw 360 in the takeup nut 365. The latter is similar in construction and operation to the front carriage cross slide takeup nut 178, hence a description is unnecessary. The rear carriage slide nut 365 is held in position by the bolt 366 passing therethrough. The cross slide 364 is provided with a slot 367 for the reception of a tool post or cutter head. (Figure 30.)

The machine tool of my in
with a push button switch pa
having a plurality of manu
button switches thereon.
switch panel 395 is preferabl
hollow post through which t
ductors may be run, and whic
in any location most conven
of the operator. The six u
pertain to various movement
riages and the starting and s
chine, whereas the two lowe
actuate a four-way switch.

The switch panel 395 co
push button switch 400, the f
button switch 401, the rear
ton switch 403, the starting
404, the reverse push button
four-way push button switch 4
in button 407 and the feed-c ntains the in-feed
ront-left feed push
in-feed push but-
push button switch
switch 405 and the
06 having the feed-
ut button 408.

The rear carriage cross slide is provided with a stop shaft 368 to which the switch stops 369 and 370 are adjustably attached by the adjusting screws 371 and 372 respectively (Figures 28 and 30). The switch stop 372 is provided with a fine adjustment consisting of the screw 373 engaging the knurled nut 374 rotating in the switch stop base 375. The latter is located in position on the stop shaft 368 by the screw 376.

The rear carriage carries the push rod guide post 377 (Figures 28 and 30), in which the switch push rods 379 and 380 are vertically reciprocable. The upper ends of the push rods 379 and 380 are adapted to be engaged by the switch stops 369 and 370, whereas the lower ends respectively engage the follower buttons of the rear carriage infeed and out-feed stop switches 381 and 382 respectively.

A typical stop switch of this pattern is shown

*Electrical circ*

*uits* its interconnecting
, magnetic clutch,
Figure 34. Power
irect current mains
e switch 425. The
ond the line switch
rminal 410a, and
0b and 410c to the
ly associated with
, the front longi-
r transverse motor
branch 410d of the
ain drive clutch 28
ctively. Still other
of the power line
two-pole contactor The electrical control circu
the various switches, relays
brake and motors are shown i
is received from the 110-volt d
409 and 410 at the power lin
power main 410 continues bey
425 to the main panel te
thence in various branches 4
individual circuits respective
the front transverse motor 7
tudinal motor 70 and the rea
120. (Figure 34). Another
power line 410 runs to the m
and main drive brake 51 respe
branches 410e, 410f and 410g
410 run to the relay 412, the
413, and the relay 414.

om the line switch

The power line 409 runs fr

From the brake-and-clutch relay 421, the line 422 goes to the main drive magnetic brake 51. The lines 423a and 423 run from the split relay 418 to the front-right relay 419, the line 423 continuing to the rear-out relay 420. From the line 423 the branch 423b runs leftward to the starting push button switch 404. From the opposite terminal of the latter, the line 424 runs to the relay 414, whose opposite coil terminal is directly connected to the power line 410 by the branch lines 410g and 410e.

The 14-volt control circuit is grounded through the line 427 at the dynamotor 426. The other line 428 therefrom runs to the relay 414, the front-right relay 419 and the rear-out relay 420. The line 429 runs rightward from the relay 414 to the split relay 418 and the rear-in relay 430, and by the branch 429a to the brake-and-clutch relay 421. The line 429 also runs leftward to the front-out relay 431, the relay 432 and the front-in relay 433.

*Electrical and mechanical operation*

To start the machine, the line switch 425 is closed. (Figure 34.) To start the feeding cycle, the push button switch 404 is depressed, disconnecting the lines 423 and 424, and connecting the lines 437 and 436.

As soon as the line switch 425 was closed, and without the necessity of closing the starting push button switch 404, the following electrical apparatus was energized: the front-right relay 419 and the rear-out relay 420 were energized directly from the dynamotor 426 by the line 428 the connections being continued to the ground through the lines 456 and 457 to the front-right switch 265 and the rear-out switch 382 respectively; the two-pole contactor 413 is also energized directly from the power line 410 by way of the branches 410e and 410f, the opposite pole being connected by the line 416 to the reverse push button switch 405, thence by the line 409b to the power line 409 and the power switch 425.

The depressing of the starter button 404 causes the relay 414 to become de-energized by the de-energization of the line 424 leading to its coil. The switch blade of the relay 414 accordingly flies open, connecting the line 428 with the line 429 and thus allowing current to pass therethrough to the upper half of the split relay 418, energizing it through the line 438 leading to the ground through the front-out switch 273. The front-in relay 433 is also energized from the lines 429 and 436a from the line 436, the latter leading through the now-depressed push button starter switch 404 to and through the lines 437 and 437a leading to the ground through the front-in switch 272. The relay 412 now becomes energized on the one side through the power lines 410f, 410e and 410, and on the other side by way of the lines 434 and 434a, the switchblade of the now-closed front-in relay 433, the line 448 through the switchblade of the now-closed relay 432, and the lines 446 and 446a to and through the switchblade of the now closed split relay 418 to its power line connection 409c, thence along the line 409b to the power line 409.

The line 429 also runs rightward from the relay 414 to the coil of the rear-in relay 430, but the latter is not energized since its ground circuit 439—439a through the rear-in push button 402 is in open circuit until the normally-open rear carriage pick-up switch 264 is closed by the motion of the front carriage: beyond the latter switch the line 440 runs to the ground through the rear-in switch 381.

The front-out relay 431 is also energized by depressing the starter button 404, through the line 429 on the one hand and the line 438 on the other, the latter leading directly to the ground through the front-out switch 273. The relay 432 is similarly energized on the one side from the line 429 and on the other side through the line 443 leading to the two-pole contactor switch 413 and thence by the line 444 to the template follower switch 300, thence by the line 445 to the ground through the front-left switch 253.

The brake-and-clutch relay 421 is similarly energized from the line 429a on the one side and the line 441 on the other side, the latter leading to the ground through the spindle stop push button switch 403.

All of the above energizations, and the de-energization of the relay 414 occur either through the closing of the line switch 425, or through the depressing of the push button starter switch 404.

The energization of the brake-and-clutch relay 421 shifts the switch blade thereof to disconnect the power line 409d from the line 422 and connect it to the line 442: this action de-energizes the main drive brake 51, releasing the main spindle 6, and energizes the main drive clutch 28, thus applying power from the main motor 20 to the main spindle 6 and rotating the work piece.

Meanwhile the closing of the split relay 418, the relay 432 and the front-in relay 433 now permits electric current to flow from the power line 409 by way of its branches 409b and 409c through the switch blade of the split relay 418, lines 446a and 446, the switch blade of the relay 432, the line 448, the switch blade of the front-in relay 433, the lines 434a and 434, the front-in push button switch 400, the lines 435 and 435a, the four-way switch 406 and the line 435b to the front-in motor relay 470, energizing it.

The energization of the front-in motor relay 470 closes its contactors 471 and 472, and opens the dynamic brake relay 473. Power current then passes from the power line 409 by way of the lines 409e and 409f through the shunt field 474, rheostat 475 and armature 476 of the front transverse motor 471 causing the latter to rotate and feed the front cutting tool inward.

The cutting tool feeds inward until the front cross slide trips the front-in switch 272 in the manner previously described, opening it and likewise opening the circuit in the lines 437a and 437 leading to the starter push button switch 404 and thence by the lines 436 and 436a to the front-in relay 433 coil, thus de-energizing the front-in relay 433. This de-energizes the relay 412 by de-energizing the lines 434a and 434 leading to the coil thereof, the front-in motor relay 470 dependent thereon, opens the latter's contactors 471 and 472, and stops the front transverse motor 71.

The opening of the front-in relay 433 thus causes its switch blade to disconnect the line 448 from the line 434 and connect it to the line 449. Current then flows from the power line 409 by way of its branches 409b and 409c through the switch blade of the closed split relay 418, along the lines 446a and 446, downward and leftward to the closed relay 432, thence through the switch blade thereof and the line 448 therefrom to and through the switch blade of the open front-in relay 433, thence by the line 449 to the front left push button 401, thence by the line 450 to the front left relay 477. This energizes the latter, closes its contactors 478 and 479, and opens the dynamic brake relay 473. Power current is then caused to flow by way of the power lines 409, 409g, 409h and 409i through the shunt field 480, the rheostat 481 and the armature 482 of the front longitudinal motor 70, starting it and causing the front carriage and cutting tool to feed to the left. The front cutting tool and the front carriage continue to feed to the left longitudinally until the carriage trips the front left switch 253 in the manner previously described. This action de-energizes the lines 445, 444, and 443, thus de-energizing the relay 432 and with it the front-left motor relay 477, opening the contactors 478 and 479 of the latter and stopping the front longitudinal motor 70. Current then goes from the power line 409c at the closed split relay 418 through the switch blade thereof and the lines 446a and 446 through the switch blade of the open relay 432, the line 451, the switch blade of the closed front-out relay 431, the line 452, the four-way switch 406 and the line 452a to the front-out motor relay 433, energizing the latter through its connection with the power line 410b and closing its contactors 484 and 485; the same action also opens the dynamic brake relay 473. Power current can then pass from the power line 409 through the contactor 484 around the shunt field 474 and rheostat 475 to and through the armature 476 of the front transverse motor 71, thence through the contactor 485 to the power line 410b, causing the front transverse motor 71 to operate at its full speed and causing the front tool and front cross slide to rapidly traverse outward until the cross slide trips the front-out switch 273.

The opening of the front-out switch 273 breaks the circuit in the line 438 leading therefrom, and accordingly de-energizes the front-out relay 431 and the upper half of the split relay 418. The de-energization of the front-out relay 431 de-energizes the front-out motor relay 483, opening its contactors 484 and 485, and stopping the front transverse motor 71 in its rapid traverse motion outward.

Meanwhile, as the front carriage was feeding to the leftward, it closed the rear carriage pick-up switch 264 before it reached the limit of its motion. This closed the circuit between the lines 439a and 440 at the rear carriage pick-up switch 264, thus energizing the rear-in relay 430 through the rear-in push button switch 402. Meanwhile the lower half of the split relay 418 has been energized through the line 429 on the one side and the line 453 on the other, the latter leading through the two-pole contactor 413, thence by the line 440 to the ground through the rear-in switch 381.

The closing of the rear-in relay 430 allows power current to flow from the line 409c at the split relay 418 through the closed blade thereof and the lines 446a and 446 therefrom, thence through the closed switch blade of the rear-in relay 430 to and through the line 447 leading to the rear-in motor relay 490, energizing it from the power line 410c. This opens the dynamic brake relay 473 and closes the contactors 491 and 492 of the rear-in motor relay 490. Current is then caused to flow through the shunt field 493, the rheostat 494 and the armature 495 of the rear transverse motor 120, causing it to rotate and feed the rear tool and cross slide inward.

The rear cross slide moves inward until it trips the rear-in switch 381, opening the circuit in the line 440. This de-energizes the rear-in relay 430 through the line 440, the rear carriage pick-up switch 264, the line 439a, and the rear-in push button switch 402. As a consequence the rear-in motor relay 490 is de-energized, opening its contactors 491 and 492, and stopping the inward feeding motion of the rear transverse motor 120. The same action de-energizes the lower half of the split relay 418 by de-energizing its lines 429, 439a, and 440 leading to the rear-in switch 381. The already-energized front-right relay 419 then passes current from the power line 409c through the switch blade of the opened split relay 418, the lines 423a and 423, the front-right relay 419 switch blade, and the line 455 to the front-right motor relay 496, energizing it, opening the dynamic brake relay 473 and closing the contactors 497 and 498. Current then passes around the shunt field 480 and rheostat 481 to the armature 482 of the front longitudinal motor 70, causing the front carriage to rapid traverse to the right until it trips the front-right switch 265.

The opening of the front-right switch 265 de-energizes the front-right relay 419 by de-energizing its line 456, thus de-energizing the front-right motor relay 496 and stopping the front longitudinal motor 70. The rear-out relay 420 has already been energized, as previously described, and thus passes current from the power line 409c at the split relay 418 through the lines 423a and 423 therefrom, through the closed switch blade of the rear-out relay 420 and the line 454 to the rear-out motor relay 499, energizing it by thus connecting it to the power line 410h. This opens the dynamic relay 473 and closes the contactors 500 and 501, thus permitting current to flow directly around the shunt field 493 and rheostat 494 to the armature 495 of the rear transverse motor 120, causing it to rapidly traverse the rear cross slide and tool outward from the work piece.

The rear cross slide moves rapidly outward until it trips the rear-out switch 382, de-energizing the line 457 running therefrom. This de-energizes the rear-out relay 420, and accordingly de-energizes the rear-out motor relay 499, stopping the rotation of the rear transverse motor 120 and halting the rapid traverse of the rear cross slide outward.

To make the tool and cross slide feed slowly outward and rapidly traverse inward, the usual operation of the apparatus is reversed. To accomplish this, the cross slide gearing is reversed by shifting the gear shift lever 191 on the apron of the front carriage. The four-way switch 406 is likewise shifted so that the line 452 is cross-connected to the line 435b, and the line 435 is similarly cross-connected to the line 452a.

This shifting of the four-way switch 406 causes the front-in relay 433 to control and energize the front-out (rapid traverse) motor relay 483. It also causes the front-out relay 431 to control and energize the front-in (feeding) motor relay 470. The mechanical reversal of the cross-slide mechanism, however, causes the normally front-out rapid traverse motion of the front transverse motor 71 to produce an inward, rapid traverse motion of the front cross slide. It also causes the normally front-in feeding motion of the front transverse motor to produce an outward feeding motion of the cross slide.

To rapidly traverse the tool inward, the starter push button switch 404 is depressed as usual, and the front-in relay 433 thereupon becomes energized in the manner previously described. Through the reversal of connections and gearing above described, the front-out motor relay 483 becomes energized, causing the front transverse motor 71 to operate in a reverse direction and rapidly traverse the front tool slide inward. The front cross slide and tool move rapidly inward until the cross slide trips the front-in switch 272, de-energizing the front-in relay 433. The front-out motor relay 483 is likewise de-energized, and the front transverse motor 71 stops rotating.

Power current now passes from the line 448 to the line 449, at the front-in relay 433, thence along the line 449 through the front-left switch 401, thence by the line 450 through the front-left motor relay 477, causing the front longitudinal motor 70 to rotate and feed the front tool leftward. The front tool feeds leftward until it trips the front left switch 253, energizing the front-out relay 431. The latter, through the reversal of connections by the shifting of the four-way switch 406 and the mechanical reversal of the front carriage gearing, energizes the front-in motor relay 470 which now causes the front transverse motor 71 to rotate and feed the front tool slowly outward.

The front cross slide thus moves outward at a feeding speed until it trips the front-out switch 273. This de-energizes the line 438 connected thereto, causing the front-out relay 431 to become de-energized. The front-in motor relay 470 which is connected thereto by the reversal of the connections at the four-way switch 406 also becomes de-energized, stopping the front transverse motor 71 from feeding the front tool outward through the reverse gearing. At the same time the front-right relay 419 and accordingly the front-right motor relay 496 become operative in the manner previously described, causing the front carriage to be moved longitudinally back to the starting point.

The front tool slide and carriage may be reversed at any time and returned to the starting position by pressing the reverse push button switch 405. When this occurs, the relay 432 becomes de-energized, also the two-pole contactor 413 and the split relay 418. The latter then allows current to flow through the switch blade of the rear-out relay 420 to the rear-out motor relay 499, energizing the latter. This causes the rear transverse motor 120 to rotate, thus withdrawing the rear tool from engagement with the work piece. The de-energization of the relay 432 also causes the front-out relay 431 to become operative, thereby causing power current to flow from its switch blade to the front-out motor relay 483, causing the front transverse motor 71 to operate in a reverse direction and rapidly withdraw the front tool from engagement with the work piece.

*Machining stepped work pieces automatically*

The template follower switch 300 and the template 301 are provided for the automatic machining of work pieces having steps or portions of progressively increasing diameters. The template follower switch 300 is adjusted so that its follower button 307 is in contact with the template 301, and the front carriage gearing is reversed in the apron by shifting the lever 191. The four-way switch 406 is also shifted so as to cross-connect the lines 452 and 435b, likewise as previously described. The machine is started by pressing the starter push button switch 404, whereupon the front-in relay is energized and correspondingly energizes the front-out relay 483. The latter causes the motor to rotate and rapidly traverse the tool slide inward through the reverse gearing until the slide trips the front-in switch 272, de-energizing the front-in relay 433. This causes the tool to start feeding longitudinally leftward in a manner previously described, cutting a cylindrical portion of a constant diameter.

The tool feeds to the left and the follower button moves until it collides with the first step 319 of the template 301, opening the template follower switch 300 and de-energizing the relay 432. The latter then connects the line 446 through its switch blade to the line 451, thence to the line 452 at the front-out relay 431, thence to the line 435b across the four-way switch 406, whereupon the front-in motor relay 470 is energized. The front transverse motor 71 then starts rotating at a feeding speed, causing the front tool to feed slowly outward, cutting a transverse wall upon the work piece. The tool feeds outward until it passes the corner of the first template shoulder 319. This releases the follower button 307, closing the template follower switch 300 and re-energizing the longitudinal feeding mechanism. The tool then feeds leftward until the follower button 307 meets the second shoulder of the template 301, again opening the template follower switch 300 and again causing the longitudinal feed to be stopped and the outward feed started. A cylindrical portion of a larger diameter than the first-mentioned cylindrical portion is thus machined upon the work piece. This cycle of operations is repeated so long as the template 300 contains stepped portions. When the front carriage finally reaches its limit stop 254, the left-front switch 253 is tripped and the cutting tool is accordingly traversed rapidly back to its starting position as previously described.

The template and follower switch apparatus herein disclosed is likewise adapted to the machining of curvedly and obliquely-stepped work pieces, as well as to regularly stepped work pieces. The sequence of operations and the action of the template follower switch, together with the resulting action of the tool, are shown diagrammatically in Figure 37, and are similar to those previously described for regularly-stepped work pieces.

The alternate operation of the magnetic clutch 28 and the magnetic brake 51 through the two-way brake-and-clutch relay 421 prevents spinning of the work piece when the spindle rotating mechanism is de-energized. The line switch 425 may be opened to place the entire machine in an inoperative condition by cutting off power current both from the circuit and from the dynamotor 426.

*Machining stepped work pieces automatically, with automatic variation of feeding speeds according to depth of cut*

An important modification of my invention, previously described, is the provision of means for automatically adapting the feeding speed to the depth of the cut in the material on the work piece being machined. The circuit for accomplishing this result is shown in Figures 38 and 39. The invention is shown as applied to the longitudinal feeding apparatus, but it could equally well be applied to the transverse feeding apparatus, or to both feeds. For purposes of illustration, the longitudinal feed variation will be assumed to machine a work piece of the type shown in Figure 40. It will be seen that Figure 38 is substantially the same as Figure 34, with the exception of the fact that the longitudinal feed motor circuit immediately to the right of the main switch 425 at the bottom of the sheet is replaced by a circuit giving variable motor speeds.

This circuit is shown in the second half of the wiring diagram (Figure 39). It will also be observed that Figure 38 differs from Figure 39 in providing a connection above the blade of the front-right relay 419, as well as an additional line to the connection above the blade of the relay 432.

This modification of my invention is of a special value when turning work pieces having a large amount of material to be removed on the ends. One such type of work piece is shown in Figure 40, and comprises a stepped shaft which is to be machined from a straight cylindrical piece of material. It will be obvious that much more material must be removed from the right-hand end of the shaft having the small diameter portion 604 than from the opposite end having the large diameter portion 607. It will be understood that any number of such stepped portions may be machined. Four are shown for purposes of illustration, namely, 604, 605, 606 and 607 (Figure 40). Corresponding to these steps are the stepped portions 608, 609, 610 and 611 on the template 301 (Figure 40). The mechanism described below is so arranged and the circuit so constructed that the cutting tool feeds at a very slow rate in cutting the thick amount of material to produce the small diameter step 604; moves at a faster feeding rate to cut the larger diameter portion 605; speeds up to a still faster feeding speed in cutting the still larger diameter portion 606; increases its feeding speed still further in cutting the largest stepped portion 607; and runs at top speed in machining the final portion 612. By thus varying the feeding speeds according to the amount of material to be removed, the life of the cutting tool is materially increased and the cutting adjusted to give the maximum efficiency. Production is also increased and the rejections proportionately reduced, since the finished work has a much less tendency to exhibit "chatter" marks where the feeding speed is proportional to the depth of the cut being taken.

The controlling equipment, in addition to the equipment generally shown in Figure 34, as slightly modified in Figure 38, is mounted upon the step-up feed control switch board 613. The equipment consists of a circuit containing one or more rheostats coupled with relays which throw them in or out at will, and a variable speed motor for operating the feed of the tool. A 600 to 2400 R. P. M. variable speed motor has been found suitable. The equipment further comprises a ratchet relay for inserting the various rheostat relays and their rheostats successively into the motor circuit, a field accelerating and decelerating relay with overload protection, and various switches. The longitudinal feed motor circuit shown at the lower righthand side of the main switch 425 in Figure 34 is also included, with slight changes, below the feed step-up control switch board 613 (Figure 39), but in practice this latter circuit is associated with the machine itself. Where the circuit parts of Figures 38 and 39 are the same as those of Figure 34, like reference numerals have been employed.

As previously described, the template follower switch 300 and the template 301 are adjusted for the line 451a to the coil post 451b of the ratchet relay 628, energizing this coil and causing it to move the relay arm from the post 635 to the post 636. This drops out the rheostat relay 624 and the rheostat 614, at the same time energizing the coil of the rheostat relay 625 and throwing in the rheostat 615. The de-energization of the relay 432 connects the line 446 through its switch blade to the line 451 and thence through the switch blade of the front-out relay 431 to the line 452, energizing the front-in motor relay 470.

The front transverse motor then starts rotating at a feeding speed, causing the front tool to feed slowly outward and cut a transverse wall upon the work piece. The tool feeds outward until it passes the corner of the template shoulder 605, whereupon the follower button 307 is released, closing the template follower switch 300 and re-energizing the longitudinal feeding mechanism. The power current, however, now goes through the shunt field 630 and the line 631 to the rheostat 616, thence by the line 632 to the rheostat 617 and thence by the line 633 to the rheostat 615; thence through its arm to the line 637 therebeyond. The current then goes to the closed contact of the rheostat relay 625, thence through the coil of the field relay 629, thence along the line 660 through the contactor 478 to the motor armature 482 of the motor 70, starting the latter.

The cutting tool again feeds leftward, but at an increased feeding speed, cutting the step 605 until the follower button 307 (Figure 40) comes in contact with the shoulder of the step 610 on the template 301. This again opens the template follower switch 300, again causes the longitudinal feed to be stopped, and again re-starts the transverse out-feed. In the manner previously described, another impulse is then given to the ratchet relay 628 by current coming through the line 451a, and the arm thereof moves to the post 638 thereof. This drops out the rheostat relay 625 with the rheostat 615 and cuts in the rheostat relay 626 with its rheostat 616. The foregoing cycle of operations is thus repeated in the same manner as long as the template 300 contains stepped portions, the arm of the trip ratchet relay 626 shifting progressively to its posts 639, 640, 641, etc. The posts beyond 641 are interconnected so that all of the feeding speeds given thereby are controlled by the rheostat 617. If a variation of cutting speeds is desired throughout this range, additional rheostats and rheostat relays are provided for the additional contacts 640 to 643, etc.

When the front carriage finally reaches its limit stop 254, it trips the left-front switch 253. The cutting tool is then traversed rapidly backward to its starting position in the manner previously described, closing the contactors 497, 498 and 644. This allows the current to pass around the rheostat 617, allowing the motor to run at top speed. As the front-right relay 419 is de-energized, current by way of the line 423 thereto proceeds across the switch bar thereof (Figure 38), through the line 600 to the post 600a of the trip coil (Figure 39) of the trip ratchet relay 628. This trip coil, thus energized, detaches the pawl of the trip ratchet relay 628 and causes its arm to move backward over its various posts to the starting post 635. The trip ratchet relay 628 is thereby reset for another cycle of operations and the circuit ready to repeat the feeding and cutting operations on another work piece.

It will be understood that the foregoing variation of the feeding speed according to the depth of cut most efficiently taken may be applied to the cutting of stepped portions by the transverse feeding mechanism. Such an example would be a face plate with stepped portions proceeding outward from its center. It will also be understood that this system may be applied, not only to the individual motors 70 and 71 as shown, but also to a system of magnetic clutches or similar controlling devices for operating at various feeds of the machine.

It will be understood that I desire to comprehend within my invention such modifications as may be necessary to adapt it to varying conditions and uses.

Having thus fully described my invention, what I claim as new and desire to secure by Letters Patent is:

1. A machine tool comprising a motor-driven work holder, a bed, a carriage movable on said bed, electrical apparatus independent of said work holder driving means for moving said carriage, an electrical circuit for energizing said apparatus, an electrical circuit changer in said circuit arranged to change the condition of said circuit and stop said carriage at a predetermined position thereof on said bed, and an actuating member for said circuit changer, said circuit changer and said actuating member being adjustable relatively to one another by minute continuous gradations, whereby to smoothly and minutely vary the position of actuation thereof.

2. A machine tool comprising a motor-driven work holder, a bed, a carriage movable on said bed, an independent motor for moving said carriage, an electrical circuit for energizing said carriage-moving motor, an electrical circuit changer in said circuit arranged to change the condition of said circuit and stop said carriage at a predetermined position thereof on said bed, and an actuating member for said circuit changer, said circuit changer and said actuating member being adjustable relatively to one another by minute continuous gradations whereby to smoothly and minutely vary the position of actuation thereof.

3. A machine tool comprising a motor-driven work holder, a bed, a carriage movable on said bed, an independent motor for moving said carriage, an electrical circuit for energizing said carriage-moving motor, an electrical circuit changer in said circuit arranged to change the condition of said circuit, and an actuating member for said circuit changer adapted to actuate said circuit changer to interrupt the flow of current to said carriage-moving motor when said carriage reaches a predetermined position on said bed, said circuit changer and said actuating member being adjustable relatively to one another by minute continuous gradations, whereby to smoothly and minutely vary the position of actuation thereof.

4. A machine tool comprising a motor-driven work holder, a bed, a carriage movable on said bed, electrical apparatus independent of said work holder driving motor for moving said carriage, an electrical circuit for energizing said apparatus, an electrical circuit changer in said circuit arranged to reverse the condition of said circuit and reverse the motion of said carriage at a predetermined position thereof on said bed, and an actuating member for said circuit changer, said circuit changer and said actuating member being adjustable relatively to one another by minute continuous gradations, whereby to smoothly and minutely vary the position of actuation thereof.

5. A machine tool comprising a motor-driven work holder, a bed, a carriage movable on said bed, an independent reversible motor for moving said carriage, an electrical circuit for energizing said reversible carriage-moving motor, an electrical circuit changer in said circuit arranged to reverse the condition of said circuit, and an actuating member for said circuit changer adapted to actuate said circuit changer to reverse the direction of motion of said carriage-moving motor and said carriage at a predetermined position thereof on said bed, said circuit changer and said actuating member being adjustable relatively to one another by minute continuous gradations, whereby to smoothly and minutely vary the position of actuation thereof.

6. A machine tool comprising a motor-driven work holder, a bed, a carriage movable on said bed, a cross slide movable on said carriage, independent motors for moving said carriage and said cross slide, an electrical circuit for energizing said motors, an electrical circuit changer in said circuit arranged to change the condition of said circuit, and an actuating member for said circuit changer adapted to actuate said circuit changer to stop said carriage-moving motor and start said cross slide moving motor when said carriage reaches a predetermined position on said bed, said circuit changer and said actuating member being adjustable relatively to one another by minute continuous gradations, whereby to smoothly and minutely vary the position of actuation thereof.

7. A machine tool comprising a motor, a work holder driven by said motor, a bed, a carriage movable on said bed, a cross slide movable on said carriage, a cutting tool mounted on said cross slide, feeding motors independent of said work-holder motor and of each other for moving said carriage and said cross slide in mutually perpendicular directions, and automatically-actuated electrical devices arranged for stopping one of said independent feeding motors and starting the other thereof when said cutting tool reaches a predetermined position.

8. A machine tool comprising a motor, a work holder driven by said motor, a bed, a carriage movable longitudinally along said bed, a motor for moving said carriage longitudinally, a cross slide movable transversely of said carriage, a motor for moving said cross slide transversely, a cutting tool mounted on said cross slide, and automatically-actuated electrical devices arranged for deenergizing said carriage-moving motor and energizing said cross-slide-moving motor when said cutting tool reaches a predetermined position.

9. A machine tool comprising a motor, a work holder driven by said motor, a bed, front and rear carriages movable on said bed, motors independent of each other and of said work-holder-driving motor to move said front and rear carriages, an electrical circuit interconnecting said front and rear carriage motors to interrelate the control thereof, and automatically-actuated electrical devices in said circuit arranged for stopping said front and rear carriage-driving motors when said front and rear carriages reach predetermined positions respectively, whereby to cause the motion of one carriage to control the motion of the other carriage.

10. A machine tool comprising a motor, a work holder driven by said motor, a bed, front and rear carriages movable on said bed, motors independent of each other and of said work-holder-driving motor to move said front and rear carriages, an electrical circuit interconnecting said front and rear carriage motors to interrelate the control thereof, and automatically-actuated electrical devices in said circuit arranged for reversing the motion produced on said front and rear carriages by said front and rear driving motors when said front and rear carriages reach predetermined positions respectively, whereby to cause the motion of one carriage to control the motion of the other carriage.

11. A machine tool comprising a motor, a work holder driven by said motor, a bed, front and rear carriages movable on said bed, motors independent of each other and of said work-holder-driving motor to move said front and rear carriages, an electrical circuit interconnecting said front and rear carriage motors to interrelate the control thereof, and automatically-actuated electrical devices in said circuit arranged for stopping one of said carriage motors and starting the other of said carriage motors when one of said carriages reaches a predetermined position, whereby to cause the motion of one carriage to control the motion of the other carriage.

12. A machine tool comprising a motor, a work holder driven by said motor, a bed, front and rear carriages movable on said bed, motors independent of each other and of said work-holder-driving motor to move said front and rear carriages, an electrical circuit interconnecting said front and rear carriage motors to interrelate the control thereof, and an electrical circuit interrupter in said circuit adapted to be automatically closed and energize one of said carriage motors when the other carriage reaches a predetermined position, whereby to cause the motion of one carriage to control the motion of the other carriage.

13. A machine tool comprising a motor, a work holder driven by said motor, a bed, front and rear carriages movable on said bed, a cross slide on one of said carriages, motors independent of each other and of said work-holder-driving motor to move said front and rear carriages and said cross slide, an electrical circuit interconnecting said front and rear carriage and cross slide motors to interrelate the control thereof, and automatically-actuated electrical devices in said circuit arranged for stopping one of said carriage motors and starting the cross slide motor thereof when said carriage reaches a predetermined position, whereby to cause the motion of one carriage to control the motion of the cross slide.

14. A machine tool comprising a motor, a work holder driven by said motor, a bed, front and rear carriages movable on said bed, a cross slide on one of said carriages, motors independent of each other and said work-holder-driving motor to move said front and rear carriages and said cross slide, an electrical circuit interconnecting said front and rear carriage and cross slide motors to interrelate the control thereof, and automatically-actuated electrical devices in said circuit arranged for stopping one of said carriage motors and starting the cross slide motor and the other carriage motor when said carriage reaches a predetermined position, whereby to cause the motion of one carriage to control the motion of the cross slide and the other carriage.

15. A machine tool comprising a motor, a work holder driven by said motor, a bed, a carriage movable on said bed, a cross slide movable on said carriage, motors independent of each other and of said work-holder-driving motor for moving said carriage and cross slide, an electrical circuit interconnecting said carriage and cross slide motors to interrelate the control thereof, a guiding member, and an electrically-actuated device in said circuit engaging said guiding member and movable relatively thereto during the motion of said carriage, said device by reason of said motion being arranged to vary the electrical condition of said circuit in response to the varying configuration of said guiding member whereby to stop said carriage motion and start said cross slide motion according to the confiuration of said guiding member.

16. A machine tool comprising a motor, a work holder driven by said motor, a bed, a carriage movable on said bed, a cross slide movable on said carriage, motors independent of each other and of said work-holder-driving motor for moving said carriage and said cross slide, a guiding member, and a switch having a follower arm engaging said guiding member and movable relatively thereto during the motion of said carriage, said switch being adapted to be alternately opened and closed and thereby alternately energize said carriage and said cross slide motors according to the varying configuration of said guiding member.

17. A machine tool comprising a motor, a work holder driven by said motor, a bed, a carriage movable on said bed, a cross slide movable on said carriage, motors independent of each other and of said work-holder-driving motor for moving said carriage and cross slide, a stepped template, and a template follower switch movable relatively to said template and engaging the stepped portions thereof, said switch being adapted to be alternately opened and closed and thereby alternately energize said carriage and said cross slide motors according to the varying configuration of said stepped template.

18. In a machine tool, a template, a carriage, a tool slide mounted on the carriage, a switch on the tool slide having a switch-operating follower pin engageable with said template, lead screw means for actuating the carriage, feed rod means for actuating the tool slide, independent motor means for actuating said lead screw means and said feed rod means, and means for electrically controlling the actuation of said motor means comprising relatively movable limit switches and actuating members therefor associated with said tool slide and carriage for regulating the movement thereof.

19. In a machine tool, a template, a carriage, a tool slide mounted on the carriage, a switch on the tool slide having a switch-operating follower pin engageable with said template, lead screw means for actuating the carriage, feed rod means for actuating the tool slide, independent motor means for actuating said lead screw means and said feed rod means, means for electrically controlling the actuation of said motor means comprising relatively movable limit switches and actuating members therefor associated with said tool slide and carriage for regulating the movement thereof, said limit switches and said actuating members being positionally adjustable relatively to one another.

20. In a machine tool, a template, a carriage, a tool slide mounted on the carriage, a switch on the tool slide having a switch-operating follower pin engageable with said template, lead screw means for actuating the carriage, feed rod means for actuating the tool slide, independent motor means for actuating said lead screw means and said feed rod means, means for actuating said motor means at reversibly different speeds, and means for electrically controlling the actuation of said motor means comprising relatively movable limit switches and actuating members therefor associated with said tool slide carriage for regulating the movement thereof.

21. In a machine tool, a template, a carriage, a tool slide mounted on the carriage, a switch on the tool slide having a switch-operating follower pin engageable with said template, lead screw means for actuating the carriage, feed rod means for actuating the tool slide, independent motor means for actuating said lead screw means and said feed rod means, means for actuating said motor means for rotation more rapidly in one direction than in the reverse direction, and means for electrically controlling the actuation of said motor means comprising limit switches associated with said tool slide carriage for regulating the movement thereof.

22. In a machine tool, a template, a carriage, a tool slide mounted on the carriage, a switch on the tool slide having a switch-operating follower pin engageable with said template, lead screw means for actuating the carriage, feed rod means for actuating the tool slide, independent motor means for actuating said lead screw means and said feed rod means, and means for actuating said motor means at reversibly different speeds.

23. In a machine tool, a template, a carriage, a tool slide mounted on the carriage, a switch on the tool slide having a switch-operating follower pin engageable with said template, lead screw means for actuating the carriage, feed rod means for actuating the tool slide, independent motor means for actuating said lead screw means and said feed rod means, means for actuating said motor means at reversibly different speeds, and means for electrically controlling the distribution of electric current to said motor means comprising relatively movable limit switches and actuating members therefor associated with said tool slide and carriage for regulating the movement thereof.

24. In a machine tool, a template, a carriage, a tool slide mounted on the carriage, a switch on the tool slide having a switch-operating follower pin engageable with said template, lead screw means for actuating the carriage, feed rod means for actuating the tool slide, independent motor means for actuating said lead screw means and said feed rod means, means for actuating said motor means at reversibly different speeds, and means for electrically controlling the distribution of electric current to said motor means from said template follower switch whereby the tool may reproduce the configuration of the template upon the work piece.

25. In a machine tool, a template, a carriage, a tool slide mounted on the carriage, a switch on the tool slide having a switch-operating follower pin engageable with said template, lead screw means for actuating the carriage, feed rod means for actuating the tool slide, independent motor means for actuating said lead screw means and said feed rod means, means for mechanically reversing the application of power from the feed rod to the tool slide, means for actuating said motor means at reversibly different speeds, means for electrically controlling the distribution of electrical current to said motor means from limit switches associated with said carriage and tool slide, and means for interchanging the electrical connections thereof to cause said motor means to interchange the reversibly different speeds of rotation whereby the tool may be changed from feeding in one direction to feeding in the opposite direction and rapidly traversing in the other direction to rapidly traversing in the reverse direction.

26. A machine tool comprising a power-driven work holder, a bed, a carriage movable on said bed, a cross slide movable on said carriage, independent motors for moving said carriage and said cross slide, electromagnetic relays to control the distribution of electric current to said motors, and means associated with said carriage and cross slide to control the actuation of said relays by the motion of said carriage and cross slide.

27. A machine tool comprising a power-driven work holder, a bed, a carriage movable on said bed, a cross slide movable on said carriage, independent motors for moving said carriage and said cross slide in oppositely reversible directions, electro-magnetic relays to control the distribution of electric current to said motors, and means associated with said carriage and cross slide to control the actuation of said relays by the motion of said carriage and cross slide.

28. A machine tool comprising a power-driven work holder, a bed, a carriage movable on said bed, a cross slide movable on said carriage, independent motors for moving said carriage and said cross slide in oppositely reversible directions, electro-magnetic relays to control the distribution of electric current to said motors, means associated with said carriage and cross slide to control the actuation of said relays by the motion of said carriage and cross slide, and means for interchanging the connections of said relays to reversibly distribute the current from said relays to said motors.

29. A machine tool comprising a power-driven work holder, a bed, a carriage movable on said bed, a cross slide movable on said carriage, independent motors for moving said carriage and said cross slide in oppositely reversible directions at unequal speeds, electro-magnetic relays to control the distribution of electric current to said motors, and means associated with said carriage and cross slide to control the actuation of said relays by the motion of said carriage and cross slide.

30. A machine tool comprising a power-driven work holder, a bed, a carriage movable on said bed, a cross slide movable on said carriage, independent motors for moving said carriage and said cross slide in oppositely reversible directions at unequal speeds, electro-magnetic relays to control the distribution of electric current to said motors, means associated with said carriage and cross slide to control the actuation of said relays by the motion of said carriage and cross slide, and means for interchanging the connections of said relays to reversibly distribute the current from said relays to said motors.

31. A machine tool comprising a power-driven work holder, a bed, a cross slide movable on said carriage, independent motors for moving said carriage and said cross slide in oppositely reversible directions piece at a substantially constant speed, means for causing the cutting tool to cut a plurality of stepped portions of different diameters on said work piece, and means responsive to the diameters upon which the material is cut for automatically causing said cutting tool to be fed at different feeding speeds, said diameter-responsive means being adapted to vary said feeding speeds according to the thickness of the material to be removed from said work piece in providing the stepped portions thereon without altering the speed of said work piece during said cutting operation.

39. A machine tool for cutting stepped work pieces comprising means for rotating the work piece at a substantially constant speed, means for causing the cutting tool to feed alternately in a longitudinal and in a transverse direction to cut a plurality of stepped portions on the work piece, and means responsive to the diameters upon which the material is cut for automatically regulating the feeding speed of said cutting tool, said diameter-responsive means being adapted to retard said feeding speed in machining the stepped portions of small diameter and to increase said feeding speed in cutting the stepped portions of larger diameter without altering the speed of said work piece during said cutting operations.

CLIFFORD A. BICKEL.